(12) United States Patent
Faxér et al.

(10) Patent No.: US 11,757,495 B2
(45) Date of Patent: *Sep. 12, 2023

(54) CHANNEL STATE INFORMATION FOR REFERENCE SIGNALS IN A WIRELESS COMMUNICATION SYSTEM

(71) Applicant: Telefonaktiebolaget LM Ericsson (publ), Stockholm (SE)

(72) Inventors: Sebastian Faxér, Järfälla (SE); Robert Mark Harrison, Grapevine, TX (US); Andreas Nilsson, Gothenburg (SE); Niklas Wernersson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,179

(22) Filed: Feb. 7, 2022

(65) Prior Publication Data

US 2022/0166469 A1 May 26, 2022

Related U.S. Application Data

(63) Continuation of application No. 16/621,806, filed as application No. PCT/EP2018/065557 on Jun. 12, 2018, now Pat. No. 11,245,444.
(Continued)

(51) Int. Cl.
*H04W 4/00* (2018.01)
*H04B 7/0417* (2017.01)
(Continued)

(52) U.S. Cl.
CPC ......... *H04B 7/0417* (2013.01); *H04B 7/0626* (2013.01); *H04L 5/0057* (2013.01);
(Continued)

(58) Field of Classification Search
CPC .. H04B 7/0417; H04B 7/0626; H04B 7/0456; H04B 7/0639; H04B 7/0691;
(Continued)

(56) References Cited

U.S. PATENT DOCUMENTS

| 11,245,444 B2* | 2/2022 | Faxér ................. H04B 7/0417 |
| 2011/0194551 A1 | 8/2011 | Lee |

(Continued)

FOREIGN PATENT DOCUMENTS

| CN | 103299558 A | 9/2013 |
| CN | 104350688 A | 2/2015 |

(Continued)

OTHER PUBLICATIONS

PCT Notification of Transmittal of the International Search Report and the Written Opinion of the International Searching Authority, or the Declaration for International application No. PCT/EP2018/065557—dated Sep. 21, 2018.
(Continued)

*Primary Examiner* — Thai D Hoang
(74) *Attorney, Agent, or Firm* — BAKER BOTTS L.L.P.

(57) ABSTRACT

According to some embodiments, a method is performed by a user equipment for reporting channel state information. The user equipment is configured with two or more channel state information reference signal, CSI-RS, resources in a CSI-RS resource set. The method comprises: selecting at least two CSI-RS resources from the CSI-RS resource set, wherein each of the at least two selected CSI-RS resources are associated to a set of spatially multiplexed layers, wherein different sets comprise different layers; determining a preferred precoder matrix for the selected CSI-RS resources; and transmitting a CSI report indicating the selected CSI-RS resources and the preferred precoder matrices. The method may further comprise calculating a channel
(Continued)

estimate for the selected CSI-RS resources, and determining a channel quality indicator, CQI, corresponding to a hypothetical transmission from a plurality of effective channels where layers transmitted through the effective channels mutually interfere. The CSI report may indicate the determined CQI for the selected CSI-RS resources.

26 Claims, 13 Drawing Sheets

Related U.S. Application Data

(60) Provisional application No. 62/521,052, filed on Jun. 16, 2017.

(51) Int. Cl.
  *H04B 7/06* (2006.01)
  *H04L 5/00* (2006.01)
  *H04W 72/044* (2023.01)
  *H04W 72/1273* (2023.01)
  *H04W 72/541* (2023.01)

(52) U.S. Cl.
  CPC ..... *H04W 72/046* (2013.01); *H04W 72/1273* (2013.01); *H04W 72/541* (2023.01)

(58) Field of Classification Search
  CPC .. H04B 7/0697; H04B 7/0608; H04B 7/0802; H04L 5/0057; H04L 5/005; H04W 72/046; H04W 72/082; H04W 72/1273; H04W 72/042
  USPC ................ 370/329–330, 335–345, 347–348
  See application file for complete search history.

(56) References Cited

U.S. PATENT DOCUMENTS

| | | | |
|---|---|---|---|
| 2013/0286866 A1* | 10/2013 | Hammarwall | H04L 5/0057 370/252 |
| 2013/0301434 A1 | 11/2013 | Krishnamurthy | |
| 2013/0301448 A1* | 11/2013 | Sayana | H04B 7/0626 370/252 |
| 2013/0301465 A1 | 11/2013 | Seo | |
| 2013/0336214 A1* | 12/2013 | Sayana | H04W 72/0413 370/328 |
| 2014/0010126 A1* | 1/2014 | Sayana | H04J 3/1694 370/336 |
| 2014/0219162 A1 | 8/2014 | Eyuboglu | |
| 2015/0200754 A1* | 7/2015 | Sayana | H04B 7/024 370/328 |
| 2015/0358060 A1* | 12/2015 | Park | H04L 1/06 370/329 |
| 2016/0269084 A1* | 9/2016 | Nam | H04B 7/0417 |
| 2016/0301505 A1* | 10/2016 | Furuskog | H04B 7/0632 |
| 2017/0264405 A1 | 9/2017 | Gao | |
| 2018/0034612 A1* | 2/2018 | Lin | H04B 7/0626 |
| 2018/0042028 A1* | 2/2018 | Nam | H04W 72/082 |
| 2018/0248607 A1* | 8/2018 | Park | H04B 7/0632 |
| 2018/0278312 A1* | 9/2018 | Frenne | H04L 5/0048 |
| 2020/0322022 A1* | 10/2020 | Gao | H04L 5/0048 |
| 2021/0243782 A1* | 8/2021 | Miao | H04L 1/1854 |
| 2021/0298048 A1* | 9/2021 | Sosnin | H04W 72/0446 |
| 2022/0140872 A1* | 5/2022 | Wernersson | H04B 7/0626 370/329 |
| 2022/0182120 A1* | 6/2022 | Sergeev | H04B 7/0634 |

FOREIGN PATENT DOCUMENTS

| | | |
|---|---|---|
| CN | 105122869 A | 12/2015 |
| CN | 106134124 A | 11/2016 |
| CN | 106797649 A | 5/2017 |
| EP | 2 800 286 A1 | 11/2014 |
| EP | 2945414 | 11/2015 |
| JP | 2014502129 | 1/2014 |
| JP | 2016511953 | 4/2016 |
| WO | WO2012094608 | 7/2012 |
| WO | 2016 056970 A1 | 4/2016 |
| WO | 2016 056980 A1 | 4/2016 |
| WO | WO-2022024042 A1 * | 2/2022 |

OTHER PUBLICATIONS

3GPP TS 36.211 v14.2.0; Technical Specification; 3rd Generation Partnership Project; Technical Specification group Radio Access Network; Evolved Universal Terrestrial Radio Access (E-UTRA); Physical channels and modulation (Release 14)—Mar. 2017.
"Details of QCL assumptions and related RS design consideration," 3GPP TSG RAN WG1 Meeting #89, Hangzhou, China, R1-1706940, Huawei, HiSilicon, May 15-19, 2017.
"Discussion on cooperative transmission," 3GPP TSG RAN WG1 Meeting #89, Hangzhou, PR. China, R1-1707603 LG Electronics, May 15-19, 2017.
"Multi-panel codebooks," 3GPP TSG-RAN WG1 #89, Hangzhou, China, R1-1708695, Ericsson, May 15-19, 2017.
Japan Patent Office, Official Action in Japan Application No. 2019-569295 dated Mar. 26, 2021 (received Apr. 16, 2021).
Japan Patent Office, Official Action in JP Application No. 2019-569295 dated Mar. 28, 2022.
"Channel and interference measurement for CSI acquisition," Discussion and decision, Huawei/HiSilicon, 3GPP TSG RAN WG1 Meeting #89, May 15-19, 2017, R1-1706927.
"Channel and interference measurement for CSI acquisition," Discussion and decision, Huawei/HiSilicon, 3GPP TSG RAN WG1 Meeting #88bis, Apr. 3-7, 2017, R1-1705072.
"Enhancements to CSI feedback," Discussion and Decision, ZTI, 3GPP TSG RAN WG1 Meeting #89, May 15-19, 2017, R1-1707144.
"CSI measurement and reporting for coordinated transmission scheme," Huawei/HiSilicon, 3GPP TSG RAN WG1 Meeting #88, Feb. 13-17, 2017, R1-1701679.
China Patent Office, Official Action and Search Report in CN Application No. 201880052935.0, dated Dec. 20, 2022 (not translated).

* cited by examiner

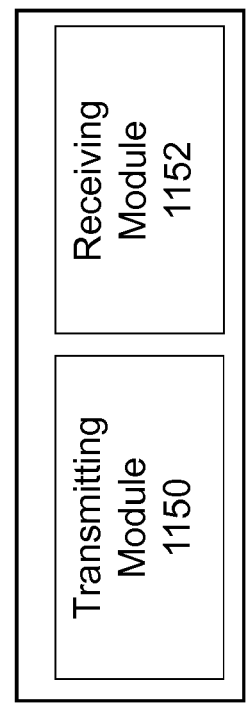
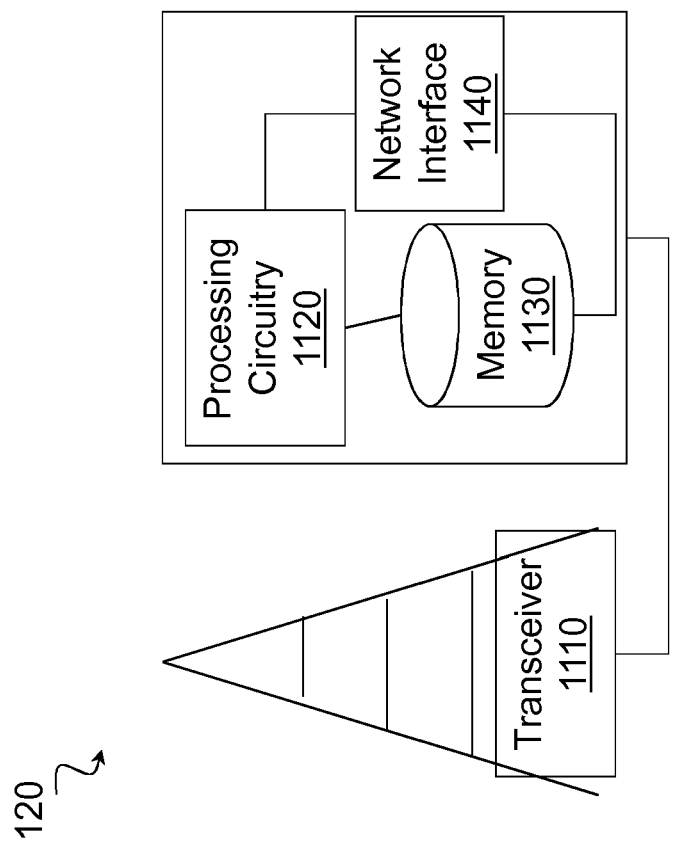
Fig. 11B
Fig. 11A

CHANNEL STATE INFORMATION FOR REFERENCE SIGNALS IN A WIRELESS COMMUNICATION SYSTEM

PRIORITY

This application is a continuation, under 35 U.S.C. § 120, of U.S. patent application Ser. No. 16/621,806 filed on Dec. 12, 2019 which is a U.S. National Stage Filing under 35 U.S.C. § 371 of International Patent Application Serial No. PCT/EP2018/065557 filed Jun. 12, 2018 and entitled "CHANNEL STATE INFORMATION FOR REFERENCE SIGNALS IN A WIRELESS COMMUNICATION SYSTEM' which claims priority to U.S. Provisional Patent Application No. 62/521,052 filed Jun. 16, 2017 both of which are hereby incorporated by reference in their entirety.

TECHNICAL FIELD

Particular embodiments are directed to channel state information in a wireless communication system for reference signal resources, each associated with spatially multiplexed layers.

BACKGROUND

The next generation mobile wireless communication system (5G) or new radio (NR) supports a diverse set of use cases and a diverse set of deployment scenarios. The deployment scenarios include deployment at both low frequencies (100s of MHz), similar to long term evolution (LTE), and very high frequencies (mm waves in the tens of GHz).

Similar to LTE, NR may use orthogonal frequency division multiplexing (OFDM) in the downlink (i.e., from a network node, gNB, eNB, or base station, to a user equipment or UE). The uplink (i.e., from UE to gNB) may use both Discrete Fourier Transform (DFT)-spread OFDM and OFDM.

The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, NR supports different subcarrier spacing values. The supported subcarrier spacing values (also referred to as different numerologies) in NR are given by $\Delta f=(15\times2^{\alpha})$ kHz where a is a non-negative integer.

Resource allocation in LTE is typically described in terms of resource blocks (RBs), where a resource block corresponds to one slot (0.5 ms) in the time domain and twelve contiguous subcarriers in the frequency domain. Resource blocks are numbered in the frequency domain, starting with 0 from one end of the system bandwidth. Physical layer procedures for 3GPP LTE release 14 are specified in 3GPP TS 36.213V14.2.0. For NR, a resource block is also twelve subcarriers in frequency but may differ in the time domain. A RB may also be referred to as physical RB (PRB). The 3GPP NR study on physical layer aspects is described in 3GPP TR 38.802 v14.0.0.

In the time domain, downlink and uplink transmissions in NR may be organized into equally-sized subframes similar to LTE as shown in FIG. 2. In NR, the subframe length for a reference numerology of $(15\times2^{\alpha})$ kHz is exactly $\frac{1}{2_{\alpha}}$ ms.

Downlink transmissions are dynamically scheduled (i.e., in each subframe the gNB transmits downlink control information (DCI) about which UE data is to be transmitted to and about which resource blocks in the current downlink subframe the data is transmitted on). The control signaling is typically transmitted in the first one or two OFDM symbols in each subframe in NR. The control information is carried on a Physical Control Channel (PDCCH) and data is carried on a Physical Downlink Shared Channel (PDSCH). A UE first detects and decodes PDCCH and if a PDCCH is decoded successfully, it decodes the corresponding PDSCH based on the decoded control information in the PDCCH.

Each UE is assigned a unique C-RNTI (Cell Radio Network Temporary Identifier) in the same serving cell. The CRC (cyclic redundancy check) bits of a PDCCH for a UE is scrambled by the UE's C-RNTI, so a UE recognizes its PDCCH by checking the C-RNTI used to scramble the CRC (cyclic redundancy check) bits of the PDCCH.

Uplink data transmissions are also dynamically scheduled using PDCCH. Similar to downlink, a UE first decodes uplink grants in PDCCH and then transmits data over the Physical Uplink Shared Channel (PUSCH) based the decoded control information in the uplink grant such as modulation order, coding rate, uplink resource allocation, etc.

In LTE, semi-persistent scheduling (SPS) is supported in both uplink and downlink. A sequence of periodic data transmissions is activated or deactivated by a single PDCCH. There is no PDCCH transmitted for data transmissions after activation. In SPS, the PDCCH's CRC is scrambled by a SPS-C-RNTI, which is configured for a UE if the UE supports SPS.

In addition to PUSCH, NR also supports Physical Uplink Control Channel (PUCCH). PUCCH carries uplink control information (UCI) such as HARQ (Hybrid Automatic Repeat Request) related Acknowledgement (ACK), Negative Acknowledgement (NACK), or Channel State Information (CSI) feedback.

NR includes codebook-based precoding. Multi-antenna techniques can significantly increase the data rates and reliability of a wireless communication system. The performance is particularly improved if both the transmitter and the receiver are equipped with multiple antennas, which results in a multiple-input multiple-output (MIMO) communication channel. Such systems and/or related techniques are commonly referred to as MIMO.

One component of NR is support for MIMO antenna deployments and MIMO related techniques. NR may support up to 8 or 16-layer downlink spatial multiplexing for up to 32 or 64 antenna ports with channel dependent precoding. The spatial multiplexing mode targets high data rates in favorable channel conditions. An illustration of the spatial multiplexing operation is provided in FIG. 3.

As illustrated in FIG. 3, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and is typically indicated by means of a precoder matrix indicator (PMI), which specifies a unique precoder matrix in the codebook for a given number of symbol streams. The r symbols in s each correspond to a layer and r is referred to as the transmission rank. Spatial multiplexing is achieved because multiple symbols can be transmitted simultaneously over the same time/frequency resource element (TFRE). The number of symbols r is typically adapted to suit the current channel properties.

NR uses OFDM in the downlink (and OFDM or DFT precoded OFDM in the uplink). The received $N_R \times 1$ vector $y_n$ for a certain TFRE on subcarrier n (or alternatively data TFRE number n) is thus modeled by $$y_n = H_n W s_n + e_n \quad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in channel dependent precoding. This is also commonly referred to as closed-loop precoding, and focuses the transmit energy into a subspace which is strong in the sense of conveying much of the transmitted energy to the UE. In addition, the precoder matrix may also be selected to orthogonalize the channel, which means that after proper linear equalization at the UE, the inter-layer interference is reduced.

One example method for a UE to select a precoder matrix W is to select the $W_k$ that maximizes the Frobenius norm of the hypothesized equivalent channel:

$$\max_k \|\hat{H}_n W_k\|_F^2 \quad \text{Equation 2}$$

Where $\hat{H}_n$ is a channel estimate, possibly derived from CSI-RS as described in more detail below. $W_k$ is a hypothesized precoder matrix with index k. $\hat{H}_n W_k$ is the hypothesized equivalent channel.

In closed-loop precoding for the NR downlink, the UE transmits, based on channel measurements in the forward link (downlink), recommendations to the gNodeB of a suitable precoder to use. The gNodeB configures the UE to provide feedback according to the UE's transmission mode, and may transmit CSI-RS and configure the UE to use measurements of CSI-RS to feed back recommended precoding matrices that the UE selects from a codebook.

A single precoder that is supposed to cover a large bandwidth (wideband precoding) may be fed back. It may also be beneficial to match the frequency variations of the channel and instead feed back a frequency-selective precoding report (e.g., several precoders, one per subband). This is an example of the more general case of channel state information (CSI) feedback, which also encompasses feeding back other information than recommended precoders to assist the eNodeB in subsequent transmissions to the UE. Such other information may include channel quality indicators (CQIs) as well as transmission rank indicator (RI).

Given the CSI feedback from the UE, the gNodeB determines the transmission parameters it wishes to use to transmit to the UE, including the precoding matrix, transmission rank, and modulation and coding state (MCS). These transmission parameters may differ from the recommendations the UE makes. Therefore, a rank indicator and MCS may be signaled in downlink control information (DCI), and the precoding matrix can be signaled in DCI or the gNodeB can transmit a demodulation reference signal from which the equivalent channel can be measured. The transmission rank, and thus the number of spatially multiplexed layers, is reflected in the number of columns of the precoder W. For efficient performance, it is important to select a transmission rank that matches the channel properties.

LTE includes multiple transmission schemes, such as: (a) single antenna port scheme; (b) transmit diversity scheme; (c) large delay CDD (Cyclic Delay Diversity) scheme; (d) closed-loop spatial multiplexing scheme; (e) multi-user MIMO (Multiple Input and Multiple Output) scheme; (f) dual layer scheme; and (g) up to 8 layer transmission scheme. In addition, LTE includes ten transmission modes (TMs) (i.e., Mode 1 to Mode 10).

Each transmission mode is associated with a transmission scheme. A UE is semi-statically configured with one transmission mode. For each transmission mode, the CSI contents are generally different.

For example, TM3 is associated with large delay CDD scheme, generally referred to as open-loop transmission mode. In TM3, precoder matrix indication (PMI) is not reported in CSI and only one channel quality indication (CQI) is reported regardless of rank 1 or rank 2.

TM4 is associated with close-loop spatial multiplexing scheme, generally referred to as close-loop transmission mode. CSI report includes PMI, rank indication (RI) and CQI.

TM9 is associated with the "up to 8 layer transmission scheme" and CSI report in this TM includes RI, PMI and CQI. However, in LTE Rel-14, semi-open-loop transmission and an advanced CSI codebook were introduced to TMs 9 and 10. The CSI contents are different in each case. For semi-open-loop, either no PMI or partial PMI is fed back depending on the number of antennas and codebooks used. For advanced codebook based CSI, higher resolution CSI is fed back from the UE to the base station and there are more CSI bits to feedback.

TM10 is also associated with the "up to 8-layer transmission scheme" but can support CSI feedback for more than one serving transmission point or cell, so it is often referred as a CoMP (Coordinated Multiple Transmission Point) mode. In general, the CSI contents and payload size are different for different TMs.

Similar to LTE, NR transmits a unique reference signal from each antenna port at the gNB for downlink channel estimation at a UE. Reference signals for downlink channel estimation are commonly referred to as channel state information reference signals (CSI-RSs). For N antenna ports, there will be N CSI-RS signals, each associated with one antenna port.

By measuring on CSI-RS, a UE can estimate the effective channel the CSI-RS is traversing including the radio propagation channel and antenna gains at both the gNB and the UE. Mathematically, if a known CSI-RS signal $x_i$ (i=1, 2, . . . , $N_{tx}$) is transmitted on the ith transmit antenna port at gNB, the received signal $y_j$ (j=1, 2, . . . , $N_{rx}$) on the jth receive antenna port of a UE can be expressed as $$y_j = h_{i,j} x_i + n_j$$

Where $h_{i,j}$ is the effective channel between the ith transmit antenna port and the jth receive antenna port, $n_j$ is the receiver noise associated with the jth receive antenna port, $N_{tx}$ is the number of transmit antenna ports at the gNB and $N_{rx}$ is the number of receive antenna ports at the UE.

A UE can estimate the $N_{rx} \times N_{tx}$ effective channel matrix H (H(i,j)=$h_{i,j}$) and thus the channel rank, precoding matrix, and channel quality. This is achieved by using a predesigned codebook for each rank, with each codeword in the codebook being a precoding matrix candidate. A UE searches through the codebook to find a rank, a codeword associated with the rank, and channel quality associated with the rank and precoding matrix to best match the effective channel. The rank, the precoding matrix and the channel quality are reported in the form of a rank indicator (RI), a precoding matrix indicator (PMI) and a channel quality indicator (CQI) as part of CSI feedback. This may be referred to as channel dependent precoding or closed-loop precoding. Such precoding tries to focus the transmit energy into a subspace which is strong in the sense of conveying much of the transmitted energy to the UE.

A CSI-RS signal is transmitted on a set of time-frequency resource elements (REs) associated with an antenna port. For channel estimation over a system bandwidth, CSI-RS is typically transmitted over the entire system bandwidth. The set of REs used for CSI-RS transmission is referred to as a CSI-RS resource. From a UE point of view, an antenna port is equivalent to a CSI-RS that the UE uses to measure the channel. Up to 32 (i.e., $N_{rx}$=32) antenna ports are supported in NR and thus 32 CSI-RS signals can be configured for a UE in a CSI-RS resource.

NR supports two types of CSI feedback for closed-loop transmission (i.e., Type I and Type II). Type I is codebook based PMI feedback with normal resolution targeting single user MIMO (SU-MIMO) transmissions. Type II is an enhanced CSI feedback with higher resolution targeting multi-user MIMO (MU-MIMO) transmissions.

Two different codebooks may be designed for the two feedback types. Type II feedback may use a larger number of bits for PMI feedback than in Type I.

In LTE, UEs can be configured to report CSI in periodic or aperiodic reporting modes. Periodic CSI reporting is carried on PUCCH while aperiodic CSI is carried on PUSCH. PUCCH is transmitted in a fixed or configured number of PRBs and using a single spatial layer with quadrature phase-shift keying (QPSK) modulation. PUSCH resources carrying aperiodic CSI reporting are dynamically allocated through uplink grants carried over PDCCH or enhanced PDCCH (EPDCCH), and can occupy a variable number of PRBs, use modulation states such as QPSK, 16 QAM, and 64 QAM, as well as multiple spatial layers.

In LTE, a periodic CSI report can be scheduled for the same subframes as those containing SPS PUSCH, in which case the periodic CSI reports are piggy backed on PUSCH. This allows periodic CSI to be transmitted using link adaptation, and so periodic CSI can be transmitted in a more spectrally efficient manner than on PUCCH (which always uses QPSK with a fixed number of resources). However, periodic CSI reports are formed such that they fit in the small payload of PUCCH, and so may carry less information even when they are piggy backed on PUSCH, for example, by the use of codebook subsampling. By contrast, aperiodic CSI reporting on PUSCH uses the full resolution of the CSI feedback, and is not subsampled. Furthermore, periodic CSI reporting in LTE requires that at least one PUCCH resource be configured for the UE, which is a waste of PUCCH resources which are reserved and may be unused even if the periodic CSI is always carried on PUSCH. Therefore, while LTE can transmit periodic CSI on PUSCH with semi-persistent resource allocation, such CSI is generally less accurate than aperiodic CSI on PUSCH In LTE, the PDCCH uplink grant allocates a single resource for all content to be carried on the PUSCH, including UL-SCH, CSI (including RI, CRI, RPI, CQI, and PMI), and HARQ-ACK. Because the size of the message is determined according to the reported RI, CRI, and/or RPI when CSI is piggy backed on PUSCH, the eNB does not know at the time of the uplink grant what the size of the uplink CSI will be. The eNB must therefore allocate extra resources to ensure that both the CSI and the other content will fit on the PUSCH resource. It should also be noted that CSI on PUSCH always carries complete CSI messages for each cell, CSI process, and/or eMIMO-Type. All configured parameters (i.e., one or more of RI, CRI, RPI, CQI, PMI) to be reported for the cell, CSI process, and/or eMIMO-type are reported together in one transmission on PUSCH.

The UE is generally required to update each new CSI report whether it is reported periodically or aperiodically. However, if the number of CSI reports to be produced is greater than the number of CSI processes, the UE is not required to update the CSI report to limit the UE computation complexity. This does not, however, mean that the UE is forbidden from updating the report, and so whether a CSI report will be identical to a prior transmitted report in this case is not known.

In LTE, a UE can be configured with multiple CSI-RS resources for downlink CSI acquisition purposes if Class B eMIMO-Type is used. A CSI-RS resource is defined by a certain number of CSI-RS at a certain position in the time-frequency resource grid and can be associated with a certain quasi-colocation (QCL) assumption and relative power level towards another reference signal. In Class B operation, the CSI-RS in each CSI-RS resource are typically precoded with different precoding weights so as to form different transmit beams. As part of the CSI reporting procedure, the UE may select a preferred CSI-RS resource, corresponding to a preferred transmit beam, with a CSI-RS resource indicator (CRI). The UE then determines an appropriate PMI, RI and corresponding CQI for the selected CSI-RS resource by performing a precoder search. Thus, the UE first selects the best CSI-RS resource and then applies a precoder codebook within the selected CSI-RS resource.

In NR, a UE can be configured with N≥1 CSI reporting settings, M≥1 Resource settings, and 1 CSI measurement setting, where the CSI measurement setting includes L≥1 links and the value of L may depend on the UE capability. At least the following configuration parameters are signaled via RRC at least for CSI acquisition.

N, M, and L are indicated either implicitly or explicitly. Each CSI reporting setting may include at least: (a) reported CSI parameter(s); (b) CSI Type (I or II) if reported; (c) codebook configuration including codebook subset restriction; (d) time-domain behavior; (e) frequency granularity for CQI and PMI; and (f) measurement restriction configurations.

Each Resource setting may include: (a) a configuration of S≥1 CSI-RS resource set(s); (b) a configuration of Ks≥1 CSI-RS resources for each set s, including at least: mapping to REs, the number of ports, time-domain behavior, etc.; (c) time domain behavior, such as aperiodic, periodic or semi-persistent; and (d) RS type which encompasses at least CSI-RS.

Each of the L links in CSI measurement setting may include: (a) CSI reporting setting indication, (b) resource setting indication; and (c) quantity to be measured (either channel or interference). One CSI reporting setting can be linked with one or multiple resource settings. Multiple CSI reporting settings can be linked.

At least the following may be dynamically selected by L1 or L2 signaling, if applicable: (a) one or multiple CSI reporting settings within the CSI measurement setting; (b) one or multiple CSI-RS resource sets selected from at least one resource setting; and (c) one or multiple CSI-RS resources selected from at least one CSI-RS resource set.

LTE control signaling can be carried in a variety of ways, including carrying control information on PDCCH or PUCCH, embedded in the PUSCH, in MAC control elements (MAC CEs), or in RRC signaling. Each of these mechanisms may be customized to carry a particular kind of control information.

Control information carried on PDCCH, PUCCH, or embedded in ('piggy backed on') PUSCH is physical layer related control information, such as downlink control information (DCI), uplink control information (UCI), as described in 3GPP TS 36.211, 36.212, and 36.213. DCI is generally used to instruct a UE to perform some physical layer function, providing the needed information to perform the function. UCI generally provides the network with needed information, such as HARQ-ACK, scheduling request (SR), channel state information (CSI), including CQI, PMI, RI, and/or CRI.

UCI and DCI can be transmitted on a subframe-by-subframe basis, and support rapidly varying parameters, including those that can vary with a fast fading radio channel. Because UCI and DCI can be transmitted in every subframe, UCI or DCI corresponding to a given cell tend to be on the order of tens of bits to limit the amount of control overhead.

Control information carried in MAC CEs is carried in MAC headers on the uplink and downlink shared transport channels (UL-SCH and DL-SCH), as described in 3GPP TS 36.321. Because a MAC header does not have a fixed size, control information in MAC CEs can be sent when it is needed, and does not necessarily represent a fixed overhead.

Furthermore, MAC CEs can carry larger control payloads efficiently, because they are carried in UL-SCH or DL-SCH transport channels, which benefit from link adaptation, HARQ, and can be turbo coded. MAC CEs are used to perform repetitive tasks that use a fixed set of parameters, such as maintaining timing advance or buffer status reporting, but these tasks generally do not require transmission of a MAC CE on a subframe-by-subframe basis. Consequently, channel state information related to a fast fading radio channel, such as PMI, CQI, RI, and CRI are not carried in MAC CEs in LTE up to Rel-14.

The embodiments described herein may be used with two-dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. The concept of an antenna is non-limiting in the sense that it can refer to any virtualization (e.g., linear mapping) of the physical antenna elements. For example, pairs of physical sub-elements could be fed the same signal, and thus share the same virtualized antenna port. An example of a 4×4 array with cross-polarized antenna elements is illustrated In FIG. 4.

FIG. 4 illustrates a two-dimensional antenna array of cross-polarized antenna elements ($N_P$=2), with $N_h$=4 horizontal antenna elements and $N_v$=4 vertical antenna elements. Precoding may be interpreted as multiplying the signal with different beamforming weights for each antenna prior to transmission. A typical approach is to tailor the precoder to the antenna form factor (i.e., taking into account $N_h$, $N_v$ and $N_p$ when designing the precoder codebook). Such two-dimensional codebooks may not strictly relate vertical or horizontal dimensions to the dimensions that antenna ports are associated with. Therefore, two-dimensional codebooks can be considered to have a first and a second number of antenna ports $N_1$ and $N_2$, wherein $N_1$ can correspond to either the horizontal or vertical dimension, and $N_2$ corresponds to the remaining dimension. That is, if $N_1=N_h$, then $N_2=N_v$, while if $N_1=N_v$, then $N_2=N_h$. Similarly, two-dimensional codebooks may not strictly relate antenna ports to polarization, and may be designed with cophasing mechanisms used to combine two beams or two antenna ports, as described in the following.

Some transmitters may include multi-panel antenna arrays. When building very large antenna arrays, it can be challenging to fit in all the hardware components into a single antenna panel. One building practice is to use a modular approach and construct a multi-panel antenna array consisting of multiple antenna panels (as defined above). In the general case, the spacing between the right-most antenna element of a first panel and the left-most antenna element of a second panel placed to the right of the first panel can be larger than the spacing between antenna elements within a panel, corresponding to a non-uniform multi-panel array. It is generally assumed that the tight calibration required for seamless coherent transmission between antenna elements is only done within each panel, and so, different panels of the multi-panel array can be uncalibrated. There may thus exist a frequency offset, timing misalignment, and a LO phase offset between the panels.

A multi-panel array can, for example, be parametrized in the number of vertical panels $M_g$, the number of horizontal panels $N_g$ and size of the constituent panels M, N, P. An example of a multi-panel antenna array is given in FIG. 5, which illustrates a size $M_g \times N_g$=2×2 multi-panel antenna array consisting of (M,N,P)=(4,4,2) panels.

A common type of precoding is to use a DFT-precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \quad \text{Equation 3}$$

where l=0, 1, ... $O_1 N_1$−1 is the precoder index and $O_1$ is an integer oversampling factor.

A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1d}(l) & 0 \\ 0 & w_{1D}(l) \end{bmatrix} \begin{bmatrix} 1 \\ e^{j\phi} \end{bmatrix} \quad \text{Equation 4}$$

where $e^{j\phi}$ is a cophasing factor between the two polarizations that may for instance be selected from a QPSK alphabet $$\phi \in \left\{0, \frac{\pi}{2}, \pi, \frac{3\pi}{2}\right\}.$$

A corresponding precoder vector for a two-dimensional uniform planar arrays (UPA) with $N_1 \times N_2$ antennas can be created by taking the Kronecker product of two precoder vectors as $w_{2D}(l,m)=w_{1D}(l,N_1,O_1) \otimes w_{1D}(m,N_2,O_2)$, where $O_2$ is an integer oversampling factor in the $N_2$ dimension. Each precoder $w_{2D}$ (l,m) forms a DFT beam, and all the precoders $\{w_{2D}(l,m), l=0, \ldots, N_1 O_1-1; m=0, \ldots, N_2 O_2-1\}$ form a grid of DFT beams. An example is shown in FIG. 6, where $(N_1,N_2)=(4,2)$ and $(O_1, O_2)=(4,4)$. Herein, the terms "DFT beams" and "DFT precoders" may be used interchangeably.

More generally, a beam with an index pair (l,m) can be identified by the direction in which the greatest energy is transmitted when precoding weights $w_{2D}$ (l,m) are used in the transmission. Also, a magnitude taper can be used with DFT beams to lower the beam's sidelobes. A one-dimensional DFT precoder along $N_1$ and $N_2$ dimensions with magnitude tapering can be expressed as $$w_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix},$$

$$w_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix}$$

where $0<\beta_i, \gamma_k \leq 1$ (i=0, 1, ..., $N_1$-1; k=0, 1 ..., $N_2$-1) are amplitude scaling factors. $\beta_i=1, \gamma_k=1$ (i=0, 1 ..., $N_1$-1; k=0, 1, ..., $N_2$-1) correspond to no tapering.

DFT beams (with or without a magnitude taper) have a linear phase shift between elements along each of the two dimensions. Without loss of generality, the elements of w(l,m) may be ordered according to $w(l,m)=w_{1D}(l,N_1,O_1,\beta) \otimes w_{1D}(m,N_2,O_2,\gamma)$ such that adjacent elements correspond to adjacent antenna elements along dimension $N_2$, and elements of w(l,m) spaced $N_2$ apart correspond to adjacent antenna elements along dimension $N_1$. Then the phase shift between two elements $w_{s_1}(l,m)$ and $w_{s_2}(l,m)$ of w(l,m) can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

where: (a) $s_1=i_1 N_2+i_2$ and $s_2=k_1 N_2+k_2$ (with $0 \leq i_2<N_2$, $0 \leq i_1<N_1$, $0 \leq k_2<N_2$, and $0 \leq k_1<N_1$) are integers identifying two entries of the beam w(l,m) so that $(i_1,i_2)$ indicates to a first entry of beam w(l,m) that is mapped to a first antenna element (or port) and $(k_1,k_2)$ indicates to a second entry of beam w(l,m) that is mapped to a second antenna element (or port); (b) $\alpha_{s_1}=\beta_{i_1}\gamma_{i_2}$ and $\alpha_{s_2}=\beta_{k_1}\gamma_{k_2}$ are real numbers, and $\alpha_i \neq 1$ (i=$s_1$, $s_2$) if magnitude tapering is used; otherwise $$\alpha_i = 1; (c) \Delta_1 = \frac{l}{O_1 N_1}$$

is a phase shift corresponding to a direction along an axis (e.g., the horizontal axis or azimuth); and $$(d) \Delta_2 = \frac{m}{O_2 N_2}$$

is a phase shift corresponding to direction along an axis (e.g., the vertical axis or elevation).

Therefore, a $k^{th}$ beam d(k) formed with precoder $w(l_k,m_k)$ can also be referred to by the corresponding precoder $w(l_k,m_k)$, i.e. $d(k)=w(l_k,m_k)$. Thus, a beam d(k) can be described as a set of complex numbers, each element of the set being characterized by at least one complex phase shift such that an element of the beam is related to any other element of the beam where $$d_n(k) = d_i(k)\alpha_{i,n} e^{j2\pi(p\Delta_{1,k} + q\Delta_{2,k})} = d_i(k)\alpha_{i,n}(e^{j2\pi\Delta_{1,k}})^p (e^{j2\pi\Delta_{2,k}})^q,$$

where $d_i(k)$ is the $i^{th}$ element of a beam d(k), $\alpha_{i,n}$ is a real number corresponding to the $i^{th}$ and nth elements of the beam d(k); p and q are integers; and $\Delta_{1,k}$ and $\Delta_{2,k}$ are real numbers corresponding to a beam with index pair $(l_k,m_k)$ that determine the complex phase shifts $e^{j2\pi\Delta_{1,k}}$ and $e^{j2\pi\Delta_{2,k}}$, respectively. Index pair $(l_k,m_k)$ corresponds to a direction of arrival or departure of a plane wave when beam d(k) is used for transmission or reception in a UPA or ULA. A beam d(k) can be identified with a single index k where=$l_k+N_1 O_1 m_k$, i.e., along vertical or $N_2$ dimension first, or alternatively $k=N_2 O_2 l_k+m_k$, i.e. along horizontal or $N_1$ dimension first.

Extending the precoder for a dual-polarized ULA may then be done as $$w_{2D,DP}(l, m, \phi) = \begin{bmatrix} 1 \\ e^{j\phi} \end{bmatrix} \otimes w_{2D}(l,m) = \begin{bmatrix} w_{2D}(l,m) \\ e^{j\phi} w_{2D}(l,m) \end{bmatrix} \quad \text{Equation 5}$$

$$= \begin{bmatrix} w_{2D}(l,m) & 0 \\ 0 & w_{2D}(l,m) \end{bmatrix} \begin{bmatrix} 1 \\ e^{j\phi} \end{bmatrix}$$

A precoder matrix $W_{2D,DP}$ for multi-layer transmission may be created by appending columns of DFT precoder vectors as $W_{2D,DP}^{(R)} = [w_{2D,DP}(l_1,m_1,\phi_1) w_{2D,DP}(l_2,m_2,\phi_2) \ldots w_{2D,DP}(l_R,m_R,\phi_R)]$ where R is the number of transmission layers, i.e. the transmission rank.

In a special case for a rank-2 DFT precoder, $m_1=m_2=m$ and $l_1=l_2=l$, $$W_{2D,DP}^{(2)}(l, m, \phi_1, \phi_2) = [w_{2D,DP}(l, m, \phi_1) \ w_{2D,DP}(l, m, \phi_2)] \quad \text{Equation 6}$$

$$= \begin{bmatrix} w_{2D}(l,m) & 0 \\ 0 & w_{2D}(l,m) \end{bmatrix} \begin{bmatrix} 1 & 1 \\ e^{j\phi_1} & e^{j\phi_2} \end{bmatrix}$$

For each rank, all the precoder candidates form a "precoder codebook" or a "codebook". A UE can first determine the rank of the estimated downlink wideband channel based on CSI-RS. After the rank is identified, for each subband the UE then searches through all the precoder candidates in a codebook for the determined rank to find the best precoder for the subband. For example, in case of rank=1, the UE would search through $w_{2D,DP}(k,l,\phi)$ for all the possible $(k,l,\phi)$ values. In case of rank=2, the UE would search through $W_{2D,DP}^{(2)}(k,l,\phi_1,\phi_2)$ for all the possible $(k,l,\phi_1,\phi_2)$ values.

SUMMARY

A particular problem is how to efficiently support channel state information for a wide range of antenna configurations in a flexible way, yet avoid specifying separate channel state information (CSI) feedback format for each use case related to the various antenna configurations. In the downlink, a user equipment (UE) may be served by a transmit/receive point (TRP) equipped with multiple antenna panels, or it may be served by multiple TRPs, each equipped with one or more antenna panels. The panels may use different port layouts and would thus benefit from being associated with different precoder codebooks. If a single CSI-RS resource comprises the ports from multiple panels, a variety of different precoder codebooks corresponding to different combinations of panel sizes may have to be specified, which is infeasible.

Particular embodiments obviate the problems described above. The embodiments described herein include a user equipment (UE) configured to measure on multiple CSI-RS resources, where each resource corresponds to a separate transmit/receive point (TRP) or antenna panel. The UE may select a number of channel state information reference signal (CSI-RS) resources to participate in a non-coherent joint transmission, as well as a preferred precoder matrix for each CSI-RS resource, on the basis that layers corresponding to different CSI-RS resources mutually interfere.

According to some embodiments, a method is performed by a user equipment for reporting channel state information in a wireless communication system. The user equipment is configured with two or more CSI-RS resources in a CSI-RS resource set. The method comprises selecting at least two CSI-RS resources from the CSI-RS resource set, wherein each of the at least two selected CSI-RS resources are associated to a set of spatially multiplexed layers, wherein different sets comprise different layers, determining a preferred precoder matrix for each of the selected CSI-RS resources, and transmitting a CSI report indicating each of the selected CSI-RS resources and the determined preferred precoder matrix for each of the selected CSI-RS resources.

In some aspects, a first one of the selected CSI-RS resources comprises a first set of layers and a second one of the selected CSI-RS resources comprises a second set of layers wherein the first set of layers and the second set of layers are different and the first and second set of layers mutually interfere.

The method may further comprise calculating a channel estimate for each of the selected CSI-RS resources and determining a channel quality indicator (CQI) corresponding to a hypothetical transmission from a plurality of effective channels. The effective channels depend on the preferred precoder matrices and channel estimate for each of the selected CSI-RS resources. Layers transmitted through the effective channels mutually interfere. The CSI report may further indicate the determined CQI for each of the selected CSI-RS resources.

In particular embodiments, each CSI-RS resource is associated with at least one of a number of antenna ports (P), a multi-panel antenna array port layout parametrized by a number of vertical panels ($M_g$) and a number of horizontal panels ($N_g$), and a precoder codebook. Each CSI-RS resource may be associated with a different quasi co-location (QCL) assumption.

In particular embodiments, the CSI-RS carried in each CSI-RS resource of the set of CSI-RS resources is transmitted from different antenna subsets. The different antenna subsets may belong to different transmission points or may belong to different antenna panels of the same transmission point.

In particular embodiments, the method further comprises obtaining a CSI report configuration comprising possible hypotheses for combinations of one or more CSI-RS resources. Selecting the at least two CSI-RS resources comprises selecting the at least two CSI-RS resources according to a selected one of the possible hypotheses. The CSI report indicates the selected CSI-RS resources by indicating the selected possible hypothesis.

In particular embodiments, transmitting the CSI report comprises transmitting a single message to a network node. In particular embodiments, transmitting the CSI report comprises transmitting a first message associated with one of the selected CSI-RS resources and transmitting a second message associated with a second one of the selected CSI-RS resources. The first message may be transmitted to a first transmission point and the second message may be transmitted to a second transmission point.

In particular embodiments, the determined preferred precoder matrix for at least one selected CSI-RS comprises a first preferred precoder matrix for a first subband. The method may further comprise determining, for the at least one selected CSI-RS resource, a second preferred precoder matrix for a second subband. The CSI report indicates the first and second preferred precoder matrix for the at least one selected CSI-RS resource.

In particular embodiments, the method further comprises receiving an indication of a codeword-to-layer mapping for use when determining the CQI.

According to some embodiments, a user equipment is capable of reporting channel state information in a wireless communication system. The user equipment is configured with two or more CSI-RS resources in a CSI-RS resource set. The user equipment comprises processing circuitry (1020) operable to select at least two CSI-RS resources from the CSI-RS resource set, determine a preferred precoder matrix for each of the selected CSI-RS resources, and transmit a CSI report indicating each of the selected CSI-RS resources and the determined preferred precoder matrix for each of the selected CSI-RS resources. The processing circuitry may be further operable to calculate a channel estimate for each of the selected CSI-RS resources and determine a CQI corresponding to a hypothetical transmission from a plurality of effective channels. The effective channels depend on the preferred precoder matrices and channel estimate for each of the selected CSI-RS resources. Layers transmitted through the effective channels mutually interfere. The CSI report further indicates the determined CQI for each of the selected CSI-RS resources.

A particular advantage is that the precoder matrix and CQI associated with a CSI-RS may be optimized for the particular CSI-RS. The CSI report may include more than one association of precoder matrix and CQI with a CSI-RS and each one may be optimized for the associated CSI-RS and associated transmission point or antenna panel.

In particular embodiments, the processing circuitry is further operable to obtain a CSI report configuration comprising possible hypotheses for combinations of one or more CSI-RS resources. The processing circuitry is operable to select the at least two CSI-RS resources by selecting the at least two CSI-RS resources according to a selected one of the possible hypotheses. The CSI report indicates the selected CSI-RS resources by indicating the selected possible hypothesis.

A particular advantage is that processor complexity and signaling may be reduced. For example, the set of possible hypotheses may be less than the maximum available hypotheses, thus reducing the number of hypotheses available to the user equipment and simplifying the selection process.

Also, signaling a hypothesis indicator uses fewer signaling bits than signaling identifiers of all the resources included in the particular hypothesis.

In particular embodiments, the processing circuitry is operable to transmit the CSI report by transmitting a single message to a network node. The processing circuitry may be operable to transmit the CSI report by transmitting a first message associated with one of the selected CSI-RS resources and transmitting a second message associated with a second one of the selected CSI-RS resources. The first message may be transmitted to a first transmission point and the second message may be transmitted to a second transmission point.

In particular embodiments, the determined preferred precoder matrix for at least one selected CSI-RS comprises a first preferred precoder matrix for a first subband. The processing circuitry is further operable to determine, for the at least one selected CSI-RS resource, a second preferred precoder matrix for a second subband. The CSI report indicates the first and second preferred precoder matrix for the at least one selected CSI-RS resource.

In particular embodiments, the processing circuitry is further operable to receive an indication of a codeword-to-layer mapping for use when determining the CQI.

According to some embodiments, a method performed by a network node of a wireless communication system comprises transmitting, to a user equipment, a first CSI-RS in a first CSI-RS resource of a set of at least two CSI-RS resources from a first antenna subset and a second CSI-RS in a second CSI-RS resource in the set of at least two CSI-RS resources from a second antenna subset, wherein the first and second antenna subsets comprise a first and second set of spatially multiplexed layers, respectively. and wherein the first and second set of layers are different, and receiving, from the user equipment, a CSI report comprising a first preferred precoder matrix associated with the first CSI-RS resource and a second preferred precoder matrix associated with the second CSI-RS resource. The CSI report may further comprise a CQI associated with each of the first and second preferred precoder matrices.

In some aspects a transmission associated with a first one of the selected CSI-RS resources comprises a first set of layers and a transmission associated with a second one of the selected CSI-RS resources comprises a second set of layers wherein the first set of layers and the second set of layers are different and the first and second set of layers mutually interfere.

In particular embodiments, the antenna subsets belong to different transmission points or belong to different antenna panels of the same transmission point.

In particular embodiments, receiving the CSI report comprises receiving a first message that includes the first preferred precoder matrix associated with the first CSI-RS resource and receiving a second message that includes the second preferred precoder matrix associated with the second CSI-RS resource.

In particular embodiments, the method further comprises transmitting, to the user equipment, a CSI report configuration comprising possible hypotheses for combinations of CSI-RS resources. The method may further comprise transmitting, to the user equipment, an indication on a codeword-to-layer mapping for use when determining the CQI.

According to some embodiments, a network node of a wireless communication system comprises processing circuitry operable to transmit, to a user equipment, a first CSI-RS in a first CSI-RS resource of a set of at least two CSI-RS resources from a first antenna subset and a second CSI-RS in a second CSI-RS resource in the set of at least two CSI-RS resources from a second antenna subset, wherein the first and second antenna subsets comprise a first and second set of spatially multiplexed layers, respectively. and wherein the first and second set of layers are different, and receive, from the user equipment, a CSI report comprising at least two preferred precoder matrices each associated with a CSI-RS resource of the transmitted set of CSI-RS resources. The CSI report may further comprise a CQI associated with each of the first and second preferred precoder matrices.

In particular embodiments, the antenna subsets belong to different transmission points or belong to different antenna panels of the same transmission point.

In particular embodiments, the processing circuitry is operable to receive the CSI report by receiving a first message that includes the first preferred precoder matrix associated with the first CSI-RS resource and receiving a second message that includes the second preferred precoder matrix associated with the second CSI-RS resource.

In particular embodiments, the processing circuitry is further operable to transmit, to the user equipment, a CSI report configuration comprising possible hypotheses for combinations of CSI-RS resources. The processing circuitry may be further operable to transmit, to the user equipment, an indication on a codeword-to-layer mapping for use when determining the CQI.

According to some embodiments, a user equipment is capable of reporting channel state information in a wireless communication system. The user equipment is configured with two or more CSI-RS resources in a CSI-RS resource set. The user equipment comprises a determining module (1052) and a transmitting module (1054). The determining module is operable to select at least two CSI-RS resources from the CSI-RS resource set and determine a preferred precoder matrix for each of the selected CSI-RS resources. The transmitting module is operable to transmit a CSI report indicating each of the selected CSI-RS resources and the determined preferred precoder matrix for each of the selected CSI-RS resources.

According to some embodiments, a network node of a wireless communication system comprises a transmitting module and a receiving module. The transmitting module is operable to transmit, to a user equipment, a first channel CSI-RS in a first CSI-RS resource of a set of at least two CSI-RS resources from a first antenna subset and a second CSI-RS in a second CSI-RS resource in the set of at least two CSI-RS resources from a second antenna subset. The receiving module is operable to receive, from the user equipment, a CSI report comprising a first preferred precoder matrix associated with the first CSI-RS resource and a second preferred precoder matrix associated with the second CSI-RS resource.

Also disclosed is a computer program product. The computer program product comprises instructions stored on non-transient computer-readable media which, when executed by a processor, perform the steps of selecting at least two CSI-RS resources from a CSI-RS resource set, determining a preferred precoder matrix for each of the selected CSI-RS resources, and transmitting a CSI report indicating each of the selected CSI-RS resources and the determined preferred precoder matrix for each of the selected CSI-RS resources. The instructions may be further operable to perform the steps of calculating a channel estimate for each of the selected CSI-RS resources, and determining a CQI corresponding to a hypothetical transmission from a plurality of effective channels. The effective channels depend on the preferred precoder matrices and channel estimate for each of the selected CSI-RS resources. Layers transmitted through the effective channels mutually interfere.

Another computer program product comprises instructions stored on non-transient computer-readable media which, when executed by a processor, perform the steps of transmitting, to a user equipment, a first CSI-RS in a first CSI-RS resource of a set of at least two CSI-RS resources from a first antenna subset and a second CSI-RS in a second CSI-RS resource in the set of at least two CSI-RS resources from a second antenna subset, and receiving, from the user equipment, a CSI report comprising a first preferred precoder matrix associated with the first CSI-RS resource and a second preferred precoder matrix associated with the second CSI-RS resource. The CSI report may further comprise a CQI associated with each of the first and second preferred precoder matrices.

A particular advantage of some embodiments is that a UE may jointly select a preferred precoder matrix and rank for each TRP/panel and calculate an appropriate channel quality indicator (CQI) under a non-coherent joint transmission (NC-JT) assumption. By associating each CSI-RS resource with a separate precoder codebook, particular embodiments may support a variety of different port layouts and antenna deployments.

BRIEF DESCRIPTION OF THE DRAWINGS

For a more complete understanding of the embodiments and their features and advantages, reference is now made to the following description, taken in conjunction with the accompanying drawings, in which:

FIG. 11A is a block diagram illustrating an example embodiment of a network node;

FIG. 11B is a block diagram illustrating example components of a network node.

DETAILED DESCRIPTION

Figure 1:
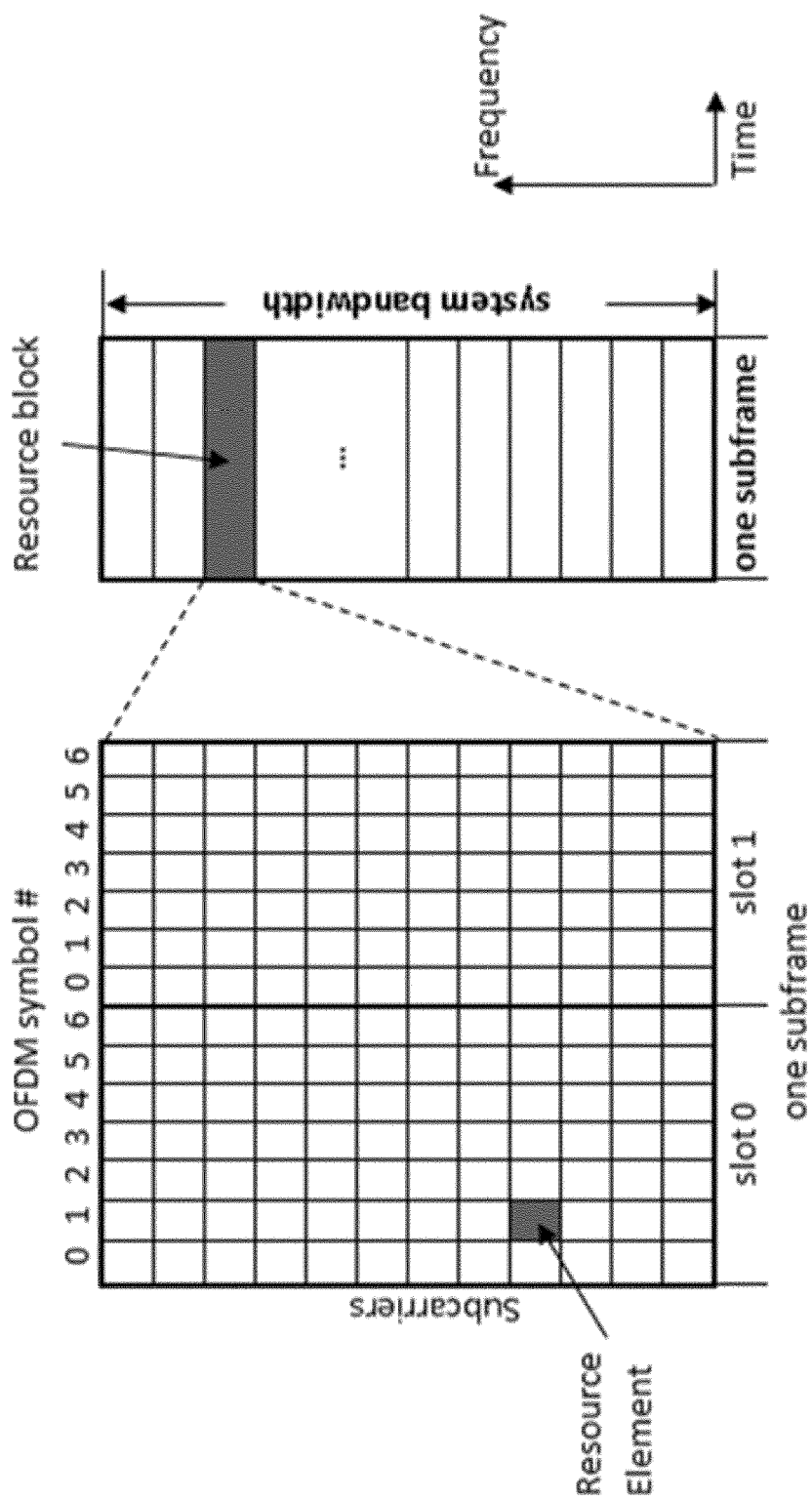
FIG. 1 illustrates long term evolution (LTE) physical resources.
Figure 2:
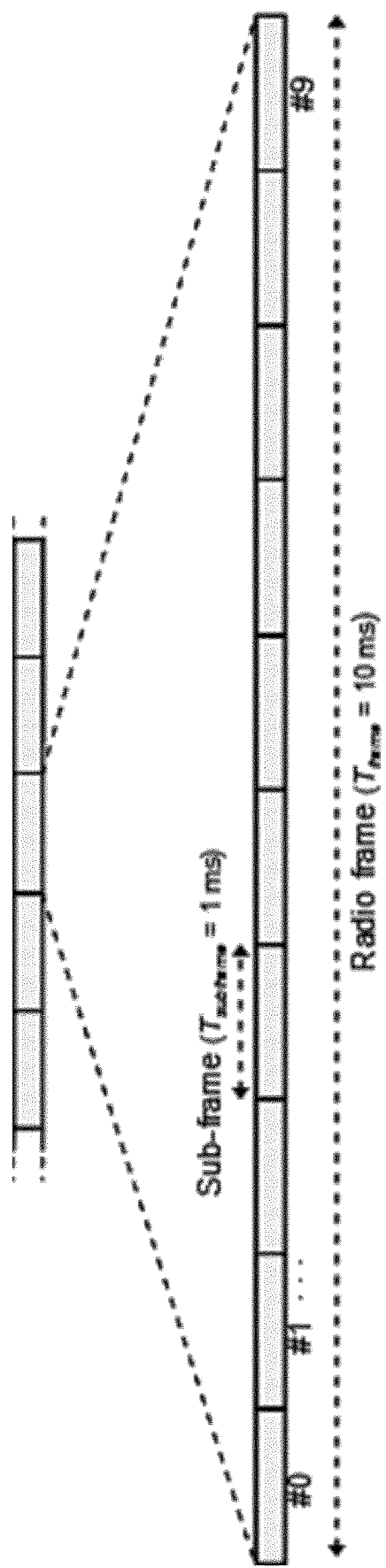
FIG. 2 illustrates an example LTE time-domain structure with 15 kHz subcarrier spacing.
Figure 3:
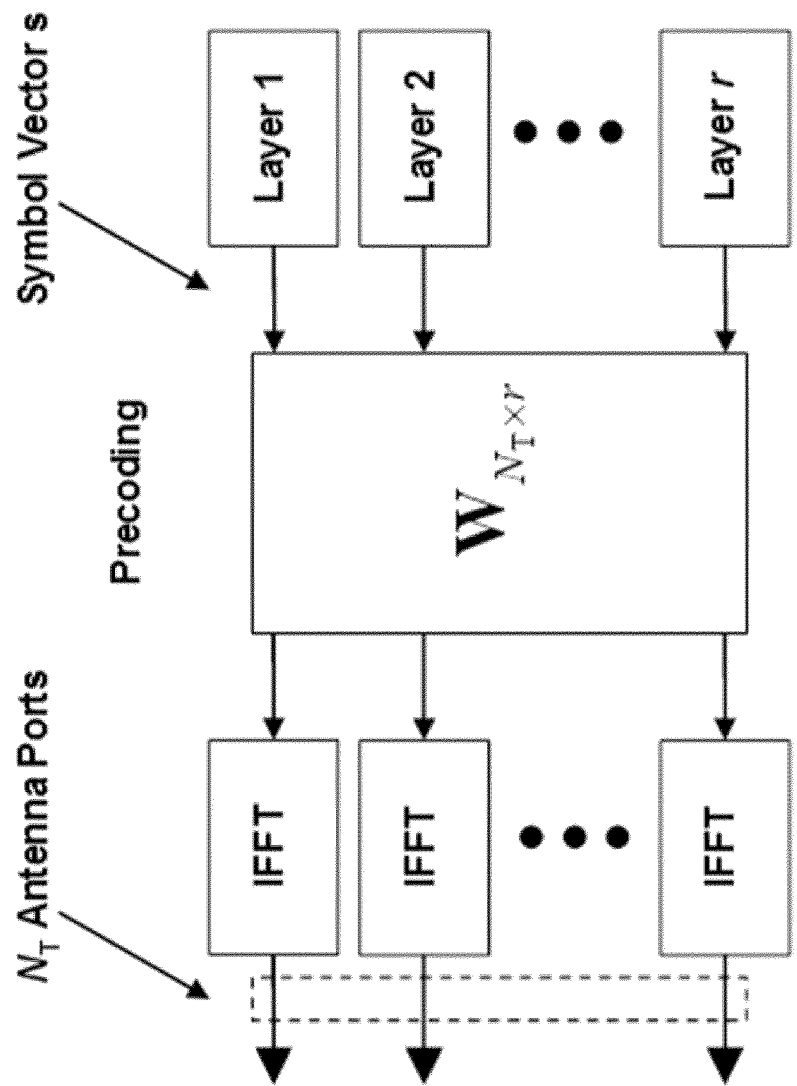
FIG. 3 is an example transmission structure of precoded spatial multiplexing in New Radio (NR)
Figure 4:
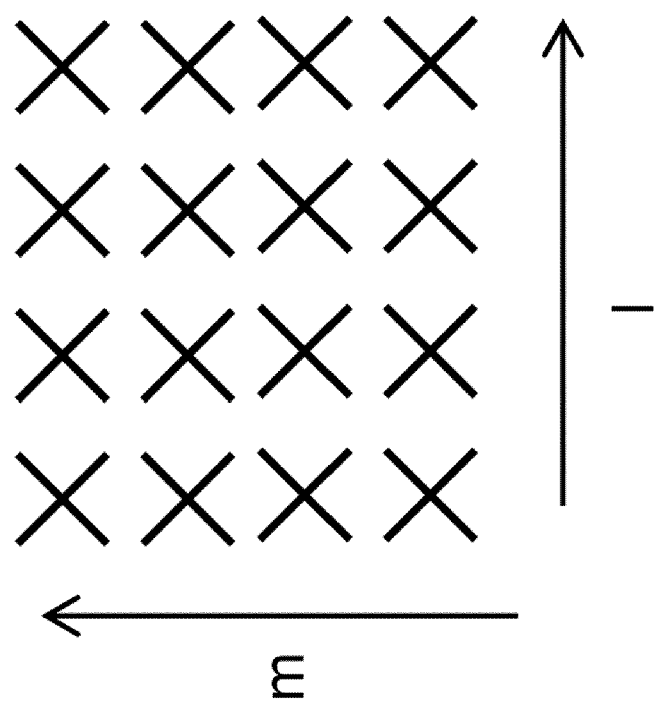
FIG. 4 is an example two-dimensional array of cross-polarized antenna elements.
Figure 5:
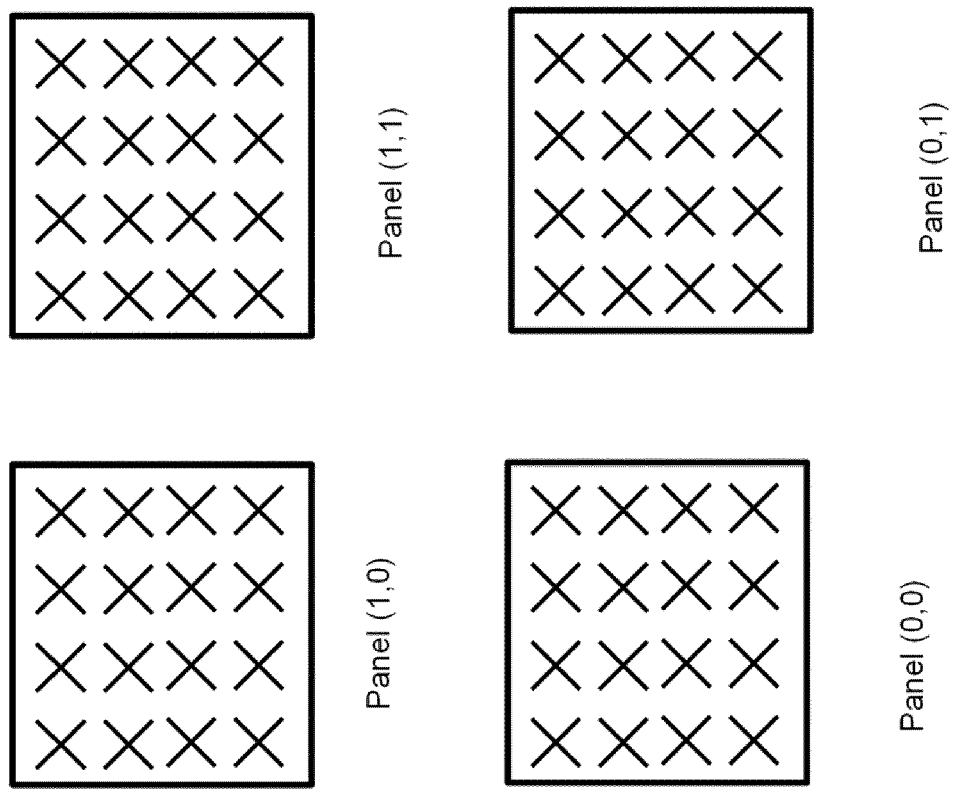
FIG. 5 is an example multi-panel antenna array.
Figure 6:
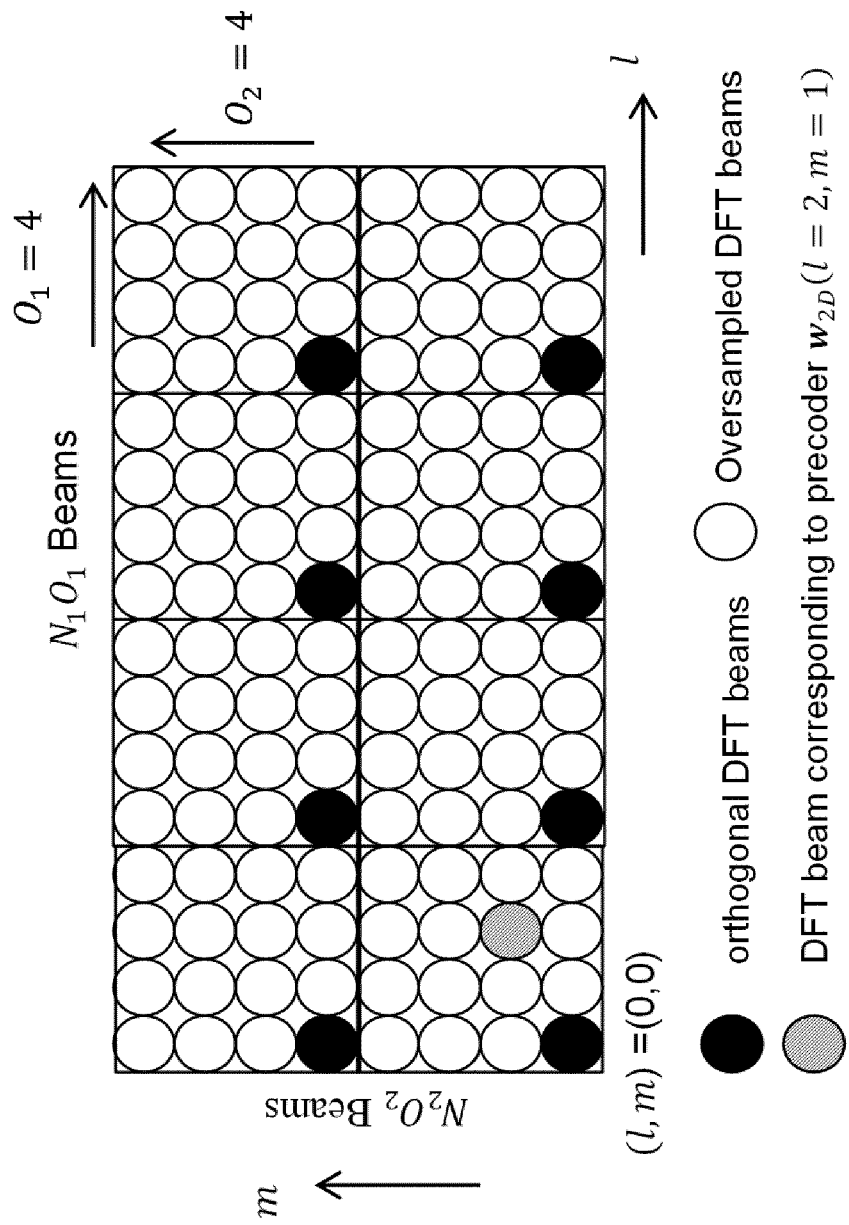
FIG. 6 is an example of oversampled DFT beams.

The next generation mobile wireless communication system (5G) or new radio (NR) supports a wide range of antenna setups, deployments, and use cases compared to long term evolution (LTE), such as multi-panel and multi-transmission reception point (TRP) operation in both the uplink and downlink. A particular problem is how to efficiently support such flexibility, yet avoid specifying separate channel state information (CSI) feedback format for each use case. In the downlink, a user equipment (UE) may be served by a transmit/receive point (TRP) equipped with multiple antenna panels, or it may be served by multiple TRPs, each equipped with one or more antenna panels. The panels may use different port layouts and would thus benefit from being associated with different precoder codebooks. If a single CSI-RS resource comprises the ports from multiple panels, a variety of different precoder codebooks corresponding to different combinations of panel sizes may have to be specified, which is infeasible.

Particular embodiments obviate the problems described above and include a UE configured to measure on multiple CSI-RS resources, where each resource corresponds to a separate transmit/receive point (TRP) or antenna panel. The UE may select a number of channel state information reference signal (CSI-RS) resources to participate in a non-coherent joint transmission, as well as a preferred precoder matrix for each CSI-RS resource, on the basis that layers corresponding to different CSI-RS resources mutually interfere.

A UE may jointly select a preferred precoder matrix and rank for each TRP/panel and calculate an appropriate channel quality indicator (CQI) under a non-coherent joint transmission (NC-JT) assumption. By associating each CSI-RS resource with a separate precoder codebook, particular embodiments may support a variety of different port layouts and antenna deployments.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 7-11B of the drawings, like numerals being used for like and corresponding parts of the various drawings. LTE and NR are used throughout this disclosure as an example cellular system, but the ideas presented herein may apply to other wireless communication systems as well.

Figure 7:
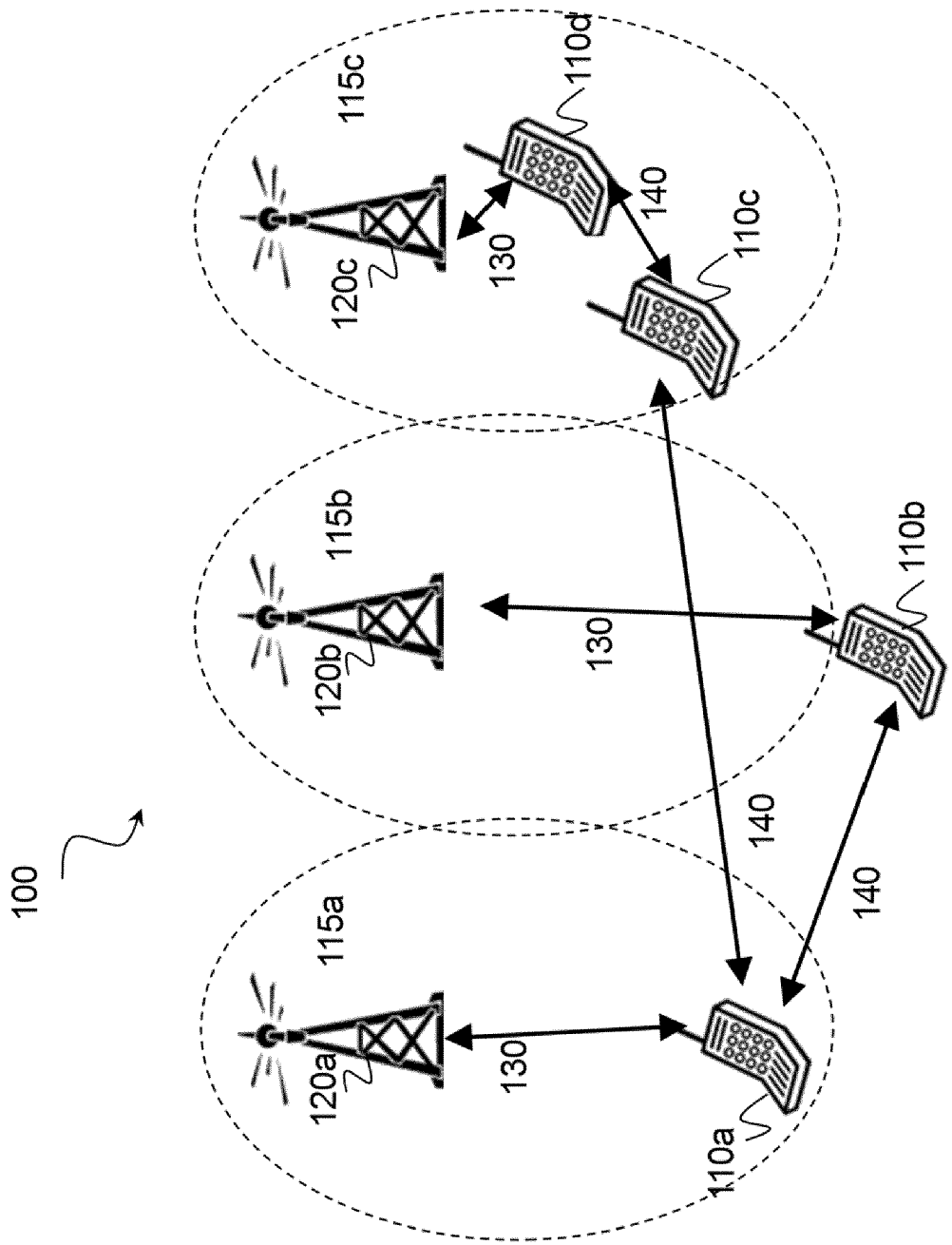
FIG. 7 is a block diagram illustrating an example wireless network, according to a particular embodiment.

FIG. 7 is a block diagram illustrating an example wireless network, according to a particular embodiment. Wireless network 100 includes one or more wireless devices 110 (such as mobile phones, smart phones, laptop computers, tablet computers, MTC devices, V2X devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals.

A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120). In LTE, the interface for communicating wireless signals between network node 120 and wireless device 110 may be referred to as a Uu interface.

Each network node 120 may have a single transmitter or multiple transmitters for transmitting signals 130 to wireless devices 110. In some embodiments, network node 120 may comprise a multi-input multi-output (MIMO) system. For example, network node may include a multi-panel or multi-TRP antenna system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. In LTE, the interface for communicating wireless signal 140 between wireless devices 110 may be referred to as a PC5 interface.

Wireless signals 130 and 140 may be transmitted on time-frequency resources. The time-frequency resources may be partitioned into radio frames, subframes, slots, and/or mini-slots. Data may be scheduled for transmission based on the partitions. For example, data transmissions may be scheduled based on subframe, slot, or mini-slot.

Wireless device 110, network node 120, or any other component of network 100 that transmits wireless signals may be referred to as a wireless transmitter. Wireless device 110, network node 120, or any other component of network 100 that receives wireless signals may be referred to as a wireless receiver.

Wireless signals 130 may include reference signals, such as CSI-RS. Network node 120 may transmit one or more CSI-RS signal on a set of time-frequency resource elements (REs) associated with an antenna port. Wireless device 110 may be configured to receive and measure the CSI-RS. Wireless device 110 may transmit CSI reports to one or more network nodes 120.

For example, network node 120 may transmit, to wireless device 110, a first CSI-RS in a first CSI-RS resource of a set of at least two CSI-RS resources from a first antenna subset and a second CSI-RS in a second CSI-RS resource in the set of at least two CSI-RS resources from a second antenna subset. An antenna subset is one or more antenna elements comprised on at least a single antenna panel comprising an antenna array. A single antenna panel may be associated with a single TRP. A multi-panel array may be associated with a single TRP, wherein an antenna subset may comprise one or more antenna panels.

In particular embodiments, wireless device 110 may configured (e.g., preconfigured, or dynamically configured via signaling from another network element, such as network node 120 with two or more CSI-RS resources in a CSI-RS resource set. Wireless device 110 may select at least two CSI-RS resources from the CSI-RS resource set, determine a preferred precoder matrix for each of the selected CSI-RS resources, and transmit a CSI report to network node 120 indicating each of the selected CSI-RS resources and the determined preferred precoder matrix for each of the selected CSI-RS resources. Wireless device 110 may calculate a channel estimate for each of the selected CSI-RS resources and determine a CQI corresponding to a hypothetical transmission from a plurality of effective channels. The effective channels depend on the preferred precoder matrices and channel estimate for each of the selected CSI-RS resources. Layers transmitted through the effective channels mutually interfere. The CSI report further indicates the determined CQI for each of the selected CSI-RS resources.

Network node 120 may receive, from wireless device 110, a CSI report comprising a first preferred precoder matrix associated with the first CSI-RS resource and a second preferred precoder matrix associated with the second CSI-RS resource. The CSI report may further comprise a CQI associated with each of the first and second preferred precoder matrices. The antenna subsets belong to different transmission points or belong to different antenna panels of the same transmission point. In particular embodiments, wireless device 110 may receive CSI-RS and report CSI according to any of the examples and embodiments described with respect to FIGS. 8-11B.

In wireless network 100, each network node 120 may use any suitable radio access technology, such as long term evolution (LTE), 5G NR, LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

Particular embodiments include CSI feedback to support non-coherent joint transmission (NC-JT) from multiple panels or multiple transmission points. With NC-JT, separate layers are transmitted from each antenna panel or transmission/reception point (TRP) to increase the transmission rank at the UE and correspondingly increase the achievable data rate. A particular benefit of non-coherent JT is to facilitate higher rank transmission in the case where the UE is rank-constrained, e.g. by being line-of-sight (LOS) to the serving transmission point or if the serving transmission point only supports a few layers. By transmitting additional layers from a non-serving transmission point, the UE's peak rate can be increased.

For NC-JT to be beneficial, accurate link adaptation is required as there can be significant inter-layer interference between the transmissions from the multiple TRPs or panels. Furthermore, it is beneficial to select the transmission rank and precoding of the participating TRPs jointly so that an optimal transmission setting may be used.

In some embodiments, a UE is configured to measure on a number of non-zero power (NZP) CSI-RS resources, where each CSI-RS resource comprises a number of CSI-RS antenna ports. Each CSI-RS resource may be associated with a different TRP or antenna panel. In some embodiments, the CSI-RS carried in a CSI-RS resource may be transmitted from different antenna subsets of the antenna array of a TRP in a non-precoded fashion, while in other embodiments, the CSI-RS are transmitted from all antennas of the antenna array of a TRP in a beamformed fashion.

Some embodiments use the NR CSI framework and configure the UE with a CSI Report Setting that is linked with one Resource Setting for channel measurement. The Resource Setting may comprise a resource set with multiple CSI-RS resources, where each CSI-RS resource corresponds to a separate TRP.

In other embodiments, the UE is configured with a CSI Report Setting linked with several Resource Settings for channel measurement where each Resource Setting is associated with a separate TRP. Each Resource Setting may comprise a set of multiple CSI-RS resources, or they may comprise a set of a single CSI-RS resource.

Regardless of how the CSI-RS resources are configured in the CSI framework and whether they belong to the same Resource Setting, the UE may in some embodiments, select a number of CSI-RS resources corresponding to a number of TRPs to indicate that a NC-JT from the TRPs is desired. In some embodiments, the selection is made with one or more CSI-RS Resource Indicator (CRI).

For example, the UE may report a "Number of Resources Indicator" (NRI), which indicates how many resources are selected along with a set of the selected CRIs: $\{CRI_1, \ldots, CRI_{NRI}\}$. Alternatively, the CRI selection may be reported using a bitmap with each bit corresponding to a CSI-RS resource. Setting the corresponding bit to one indicates that the resource is selected.

In other embodiments, each TRP transmits CSI-RS in several CSI-RS resources (if for example each TRP corresponds to a Resource Setting which in turn comprises one or more set of CSI-RS resources) corresponding to different beams in a beam sweep transmitted from a TRP. The UE may select both which TRPs it desires to participate in the NC-JT as well as which CSI-RS resource should be used per TRP. In some such embodiments, the TRP selection is made with one or more separate Resource Setting Indicator (RSI), while the selection of a CSI-RS resource per TRP (i.e., within the set of CSI-RS resources within a Resource Setting) is made with a CRI.

In some embodiments, the TRP selection is made with a single hypothesis indicator (HI). In some embodiments, the UE is configured with a set of possible hypotheses for dynamic (transmission) point selection and NC-JT in the CSI Report Setting, for example according to Table 1 below where a '1' indicates that a TRP is transmitting and a '0' indicates the opposite. In the example, the selection of HI indicates which TRPs the UE desires to participate in the transmission.

In some embodiments, the HI selection corresponds to selection of one or more Resource Setting, where additionally a CSI-RS resource within each Resource Setting may be selected. In other embodiments, the HI selection corresponds to selection of one or more CSI-RS resources and is functionally equivalent to indicating multiple CRIs. However, by preconfiguring a number of hypotheses, the signaling overhead may be reduced and additionally the number of possible hypotheses a UE may select can be constrained. For example, the network may only support NC-JT from a smaller number of TRPs than what the UE is configured to measure on (for instance, maximum two TRPs out of the three in the example below, in that case, the network may not configure HI=7). In another embodiment, the UE is configured to report multiple CSIs corresponding to multiple hypotheses in the same CSI report.

TABLE 1

Example of DPS and NC-JT hypotheses

| Hypothesis Indicator (HI) | TRP #1 | TRP #2 | TRP #3 |
|---|---|---|---|
| 1 | 1 | 0 | 0 |
| 2 | 0 | 1 | 0 |
| 3 | 0 | 0 | 1 |
| 4 | 1 | 1 | 0 |
| 5 | 0 | 1 | 1 |
| 6 | 1 | 0 | 1 |
| 7 | 1 | 1 | 1 |

In other embodiments, the UE is configured to report CSI for a certain NC-JT hypothesis and on the basis that the configured Resource Settings or NZP CSI-RS resources shall participate in the NC-JT.

Each CSI-RS resource may be associated with a separate quasi-co location (QCL) assumption. For example, it may be assumed that antenna ports within a CSI-RS resource are transmitted from a single TRP, and thus are quasi-colocated, but ports in different CSI-RS resources cannot be assumed to be transmitted from a single TRP, and therefore cannot be assumed quasi-colocated.

Each CSI-RS resource is associated with a precoder codebook. In some embodiments, the precoder codebook is a parametrized codebook that depends of the port layout $(N_1, N_2)$ of the CSI-RS resource, where the number of ports in the CSI-RS resource is $P=2N_1N_2$. In some embodiments, the port layout is associated with the CSI-RS resource in the Resource Setting and only a codebook Type (such as NR Type I or Type II) is identified in the Report Setting. In some embodiments, a codebook (which may be a function of the port layout) is identified for each linked Resource Setting in the CSI Report Setting.

For each of the selected CSI-RS resources, the UE calculates a preferred precoder matrix from the associated codebook, under the assumption that transmission occurs from all of the CSI-RS resources simultaneously. The resulting rank the UE shall select for the hypothetical transmission is thus the sum of the per-resource ranks $\upsilon_{TOT}=\Sigma_{k=1}^{K}\upsilon_k$, where $\upsilon_k$ is the rank of the precoder hypothesis for the selected CSI-RS resource k and K is the number of selected resources. The UE makes the precoder selection, on the basis that the layers corresponding to different CSI-RS resources mutually interfere.

For example, if $W_k$ is the desired precoder matrix of rank $v_k$ for CSI-RS resource $k \in \{1 \ldots K\}$ and $H_k$ is the channel estimate of the CSI-RS ports of resource k, the following effective channel is used for the hypothetical PDSCH transmission when determining PMI and CQI:

$$H_{\mathit{eff}} = [H_1 \ldots H_K] \begin{bmatrix} W_1 & \cdots & 0 \\ \vdots & \ddots & \vdots \\ 0 & \cdots & W_K \end{bmatrix} = [H_1 W_1 \ldots H_K W_K].$$

In specification language, this may be described as what correspondence between CSI-RS ports and DMRS ports shall be assumed by the UE for the hypothetical transmission when determining CQI. Assuming LTE port numbering such that DMRS antenna ports are numbered between 7-14 and CSI-RS antenna ports are numbered between 15-31, the specification text may look as follows:

PDSCH signals on antenna ports $\{p_k, p_{k+1}\}$, where $p_k = 7 + \Sigma_{l=1}^{k-1} v_l$ would result in signals equivalent to corresponding symbols transmitted on antenna ports $\{15, \ldots, 14+P_k\}$ corresponding to CSI-RS resource k in a set of K CSI-RS resources, as given by $$[y^{(15)} \ldots y^{(14+P_k)}]^T = W_k [x^{(p_k)} \ldots x^{(p_k+1)}]^T$$

where $x^{(7)}, \ldots, x^{(6+v_{TOT})}$ with $v_{TOT} = \Sigma_{k=1}^{K} v_k$ is a vector of symbols, where each symbol corresponds to a layer to be transmitted to the UE and contains all layers from all TRPs transmitting the PDSCH to the UE. In some embodiments, the vector x may correspond to the vector x from the layer mapping in Subclause 6.3.3.2 of 3GPP technical specification 36.211, e.g. a set of layers being a subset of all layers from all TRPs.

In some embodiments, indicating the preferred precoder matrix may comprise determining a PMI and RI for each selected CSI-RS resource. If a multi-stage codebook and frequency-selective precoding is used, several precoder matrices may be indicated with multiple PMI, for instance, $W_k(f) = W_{1,k} W_{2,k}(f)$.

The UE will then calculate a Channel Quality Indicator (CQI) corresponding to the preferred precoders and under the assumption that layers corresponding to the selected CSI-RS resources mutually interfere. Such mutual interference may be calculated based on Equation 1 using $y = H_{\mathit{eff}} x$, where y is a hypothesized received signal of a PDSCH comprising the mutual interference among the MIMO layers in x transmitted on the TRPs hypothesized to be transmitting the PDSCH to the UE.

In NR, NC-JT transmission from one or more TRPs can be achieved in two ways: either a single PDSCH is transmitted, where the layers within the PDSCH are transmitted from different TRPs, or multiple PDSCHs are transmitted each from a separate TRP. As a codeword-to-layer mapping is applied within a PDSCH, different number of layers per codeword, and correspondingly per CQI (where one codeword maps to one CQI), may be used for the same number of layers, depending on which way is used. Thus, in an embodiment, the codeword-to-layer mapping as well as the number of CQIs to calculate is indicated in the Report Setting, so that the reported CQI correspond to the subsequent PDSCH transmission.

In another embodiment, a non-ideal backhaul link between the TRPs participating in the NC-JT is assumed. In this case, a separate CSI report may be transmitted to each TRP, comprising only the PMI(s), RI and CQI(s) corresponding to that TRP. In other embodiments, a single CSI report is transmitted comprising the PMIs, RIs and CQIs corresponding to the different resources.

Figure 8:
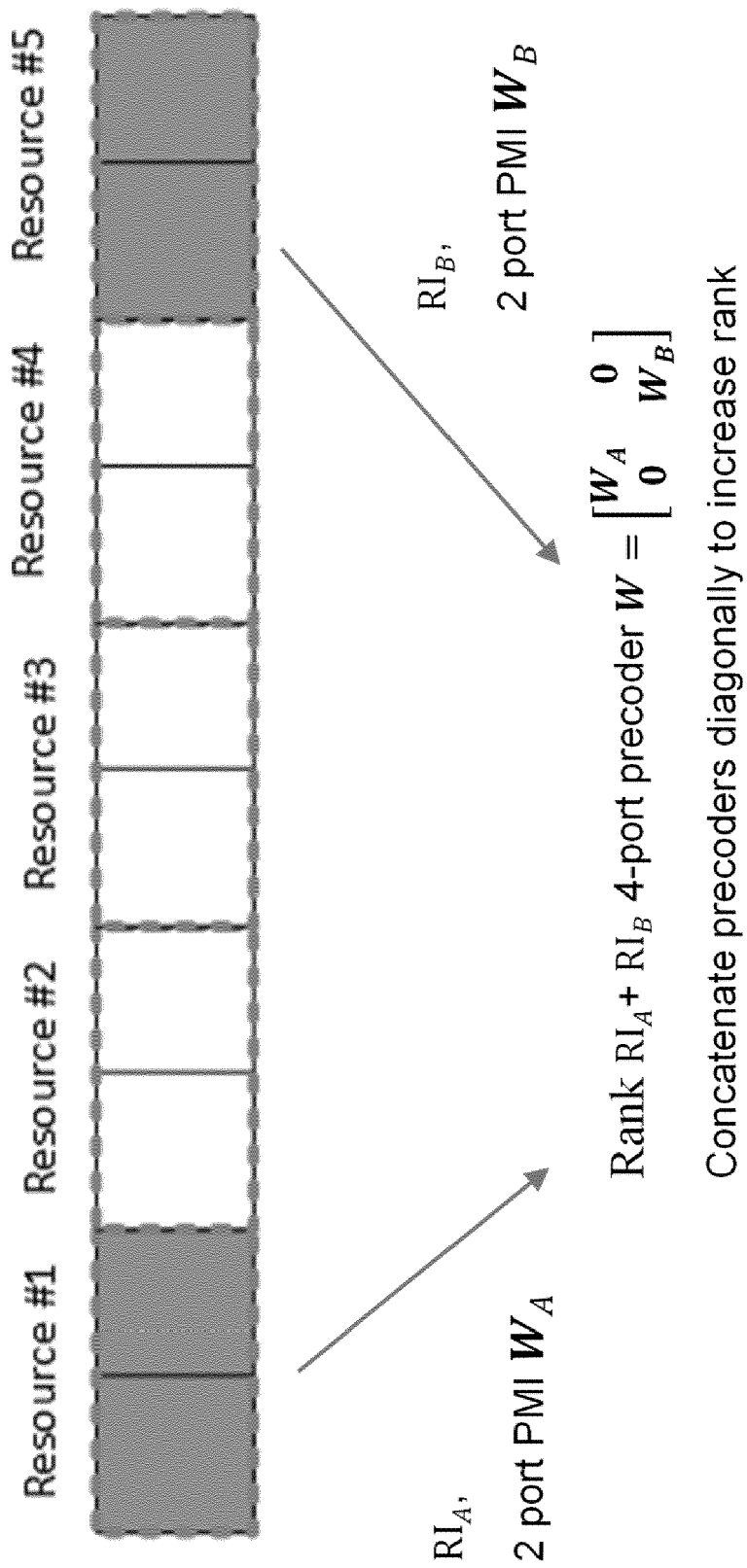
FIG. 8 is an example of a non-coherent multi-panel/TRP transmission, according to some embodiments.

FIG. 8 illustrates an example of non-coherent multi-panel/TRP transmission, according to some embodiments. The UE is configured with five 2-port CSI-RS resources and selects two resources (resources #1 and #5).

Figure 9A:
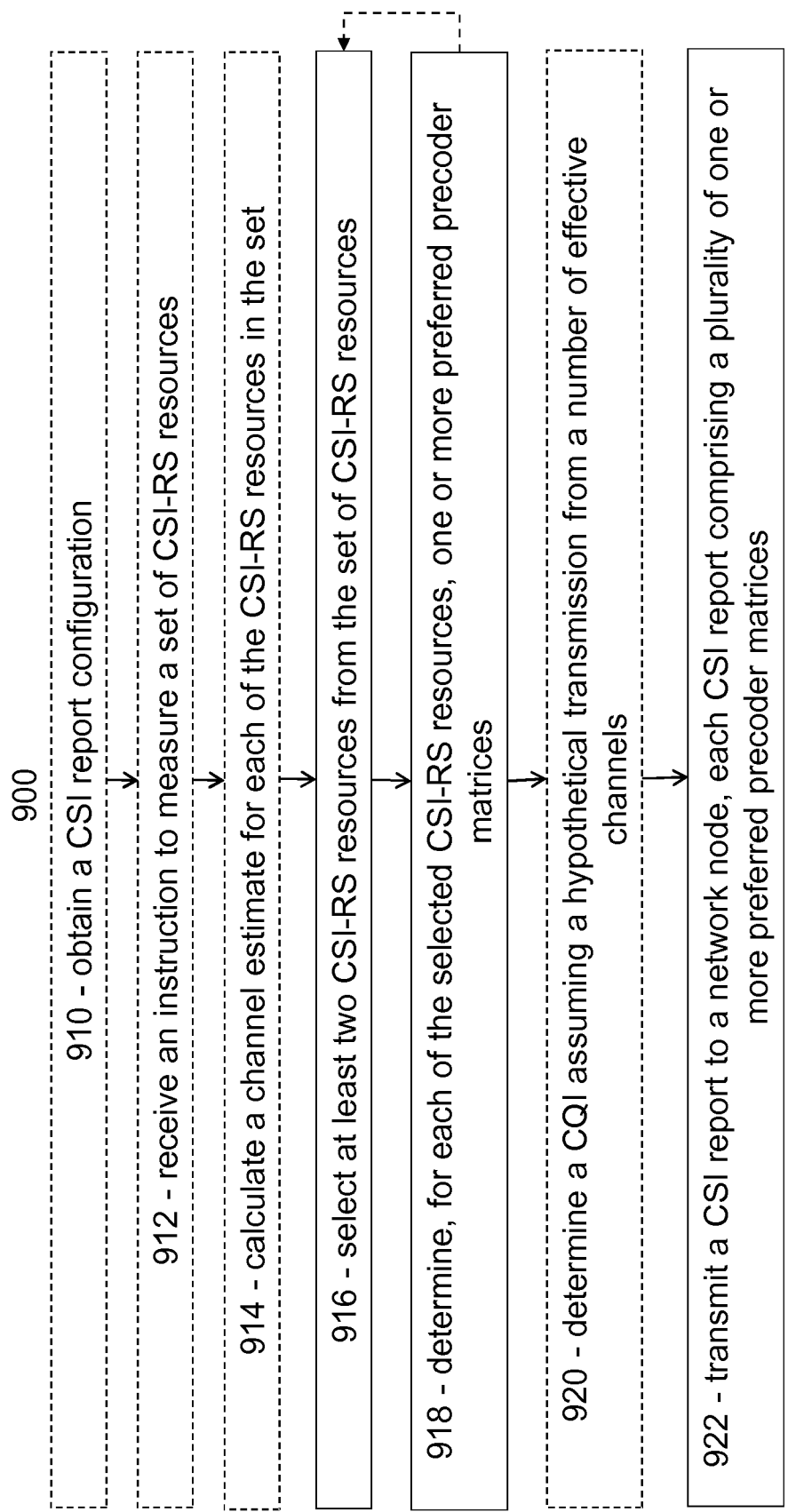
FIG. 9A is flow diagram illustrating an example method in a user equipment, according to some embodiments.
Figure 9B:
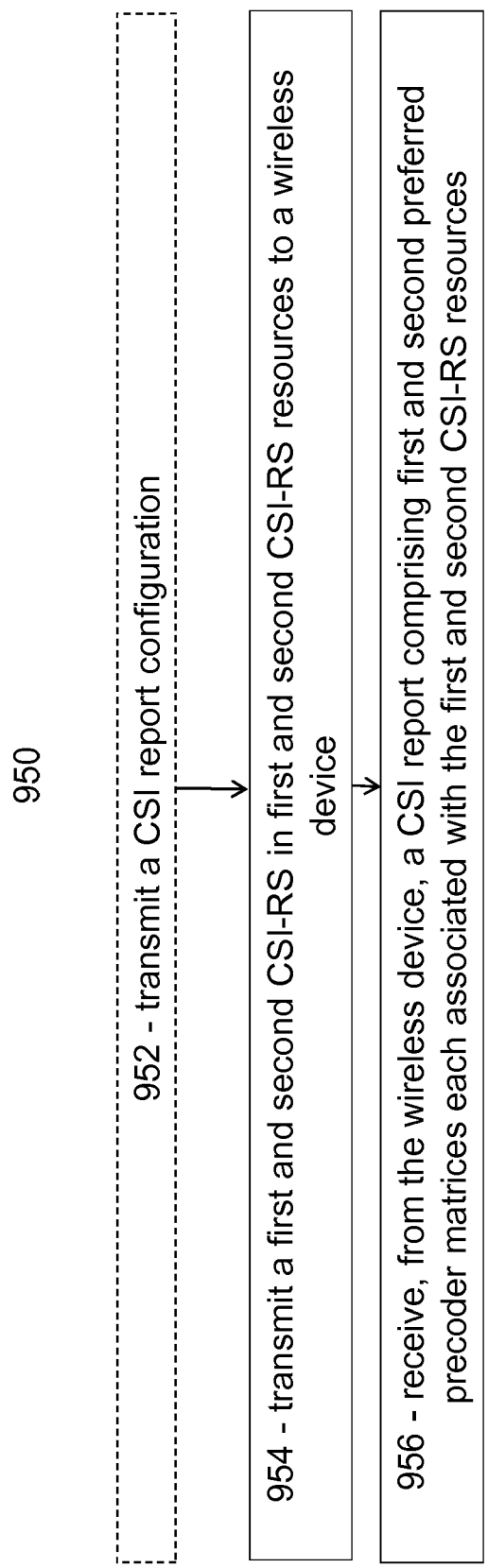
FIG. 9B is flow diagram illustrating an example method in a network node, according to some embodiments.

The examples and embodiments described above may be generalized by the flowcharts in FIGS. 9A and 9B.

FIG. 9A is flow diagram illustrating an example method in a user equipment, according to some embodiments. In particular embodiments, one or more steps of FIG. 9A may be performed by wireless device 110 of network 100 described with respect to FIG. 7.

The method may begin at step 910, where the UE obtains a CSI report configuration. For example, in some embodiments wireless device 110 may receive a report configuration from network node 120. The CSI report configuration may include any suitable configuration information for instructing the UE how to measure CSI-RS resources and how to report the measurements to the network node.

In some embodiments, the CSI report configuration may include possible hypotheses for combinations of one or more CSI-RS resources. For example, the report configuration may include a Hypothesis Indicator (HI) as described above with respect to Table 1. In another example, the UE network may transmit CSI-RS in four CSI-RS resources. The CSI report configuration may include an indicator with values 1, 2, or 3. If the indicator value is 2, for example, then the UE reports CSI information (e.g., PMI/CQI/RI) for two CSI-RS resources.

In some embodiments, the UE may be preconfigured with CSI report configuration information and obtaining the CSI report configuration may comprise reading the CSI report configuration information from memory or storage.

In some embodiments, the configuration information may include an indication of a codeword-to-layer mapping for use when determining the CQI.

At step 912, the UE may receive an instruction to measure a set of CSI-RS resources. For example, wireless device 110 may receive an instruction from network node 120 to measure CSI-RS on a set of N CSI-RS resources. In some embodiments, each CSI-RS resource may carry one or more CSI-RS.

In some embodiments, wireless device 110 may be preconfigured with a set of CSI-RS resources and a schedule for measuring the CSI-RS resources. In some embodiments, wireless device 110 may be preconfigured with a default configuration and may receive instructions to override the default configuration.

At step 914, the UE may calculate a channel estimate for each of the CSI-RS resources in the set. For example, wireless device 110 may measure and determine a channel estimate for each CSI-RS.

At step 916, the UE selects at least two CSI-RS resources from the set of CSI-RS resources. For example, wireless device 110 may select a subset K of CSI-RS from a set of N CSI-RS. K is less than or equal to N (e.g., in some embodiments the subset may include the entire set) and greater than or equal to 2. Wireless device 100 may select the subset according to any of the examples or embodiments described above. For example, selecting the subset of CSI-RS resources may comprise selecting a plurality of CSI-RS resource indicators (CRIs), or selecting a plurality of Resource Settings. The selection may be determined based on a hypothesis indicator.

At step 918, the UE determines, for each of the selected CSI-RS resources, one or more preferred precoder matrices.

For example, wireless device 110 may determine one or more preferred precoder matrices according to any of the examples or embodiments described above.

As one example, the determined precoder may be a single wideband precoder for the entire system bandwidth. As another example, the UE may determine multiple precoders for a CSI-resource. The multiple precoders may each comprise frequency selective (or subband) precoders.

At step 920, the UE may determine a CQI corresponding to a hypothetical transmission from a number of effective channels. The effective channels depend on the preferred precoder matrices and channel estimate for each of the CSI-RS resources in the subset. Layers transmitted through the effective channels mutually interfere. For example, wireless device 110 may determine a CQI based on the preferred precoder matrices and channel estimate for the subset of CSI-RS resources according to any of the examples or embodiments described above.

At step 922, the UE transmits a CSI report to one or more network nodes. Each CSI report may comprise one or more preferred precoder matrices and the one or more CQI. For example, wireless device 110 may transmit a CSI report to network node 120 according to any of the embodiments and examples described above. In some embodiments, the CSI report may include multiple messages (e.g., one message per CSI-RS resource). The multiple message may be sent to one network element, or the message may be sent to different network elements, each one responsible for one or more of the TRPs or antenna panels.

Modifications, additions, or omissions may be made to method 900 of FIG. 9A. Additionally, one or more steps in the method of FIG. 9A may be performed in parallel or in any suitable order. The steps may be repeated over time as necessary.

FIG. 9B is flow diagram illustrating an example method in a network node, according to some embodiments. In particular embodiments, one or more steps of FIG. 9B may be performed by network node 120 of network 100 described with respect to FIG. 7.

The method may begin at step 952, where the network node transmits a CSI report configuration to user equipment. For example, network node 120 may transmit a CSI report configuration to wireless device 110. The CSI report configuration is described in more detail above with respect to step 910 of FIG. 9A.

At step 954, the network node transmits a set of CSI-RS resources from a plurality of transmission points to a wireless device, for example, a first CSI-RS in a first CSI-RS resource of a set of at least two CSI-RS resources from a first antenna subset and a second CSI-RS in a second CSI-RS resource in the set of at least two CSI-RS resources from a second antenna subset. For example, network node 120 may transmit a set of CSI-RS to wireless device 110 using three transmission points. A transmission point may refer to a TRP, an antenna panel, etc. Network node 120 may transmit a first CSI-RS in a first CRI-RS resource from the first TRP, a second CSI-RS in a second CSI-RS resource from the second TRP, and so on. Since the first and second antenna subsets may comprise a first and second set of spatially multiplexed layers, respectively, wherein the first and second set of layers are different, each of the transmissions may be joint (i.e., at the same time) and non-coherent (i.e., may interfere with each other).

At step 956, the network node receives, from the wireless device, a CSI report comprising a first preferred precoder matrix associated with the first CSI-RS resource and a second preferred precoder matrix associated with the second CSI-RS resource. The CSI report may further comprise a CQI associated with each of the first and second preferred precoder matrices. For example, network node 120 may receive a CSI report from wireless device 110. Wireless device 110 may determine the CSI report according to any of the examples and embodiments described above.

Modifications, additions, or omissions may be made to method 950 of FIG. 9B. Additionally, one or more steps in the method of FIG. 9B may be performed in parallel or in any suitable order. The steps may be repeated over time as necessary.

Figure 10B:
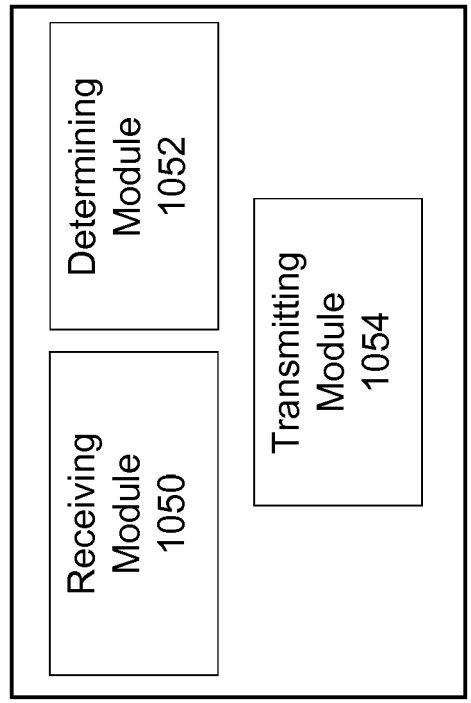
FIG. 10B is a block diagram illustrating example components of a wireless device.
Figure 10A:
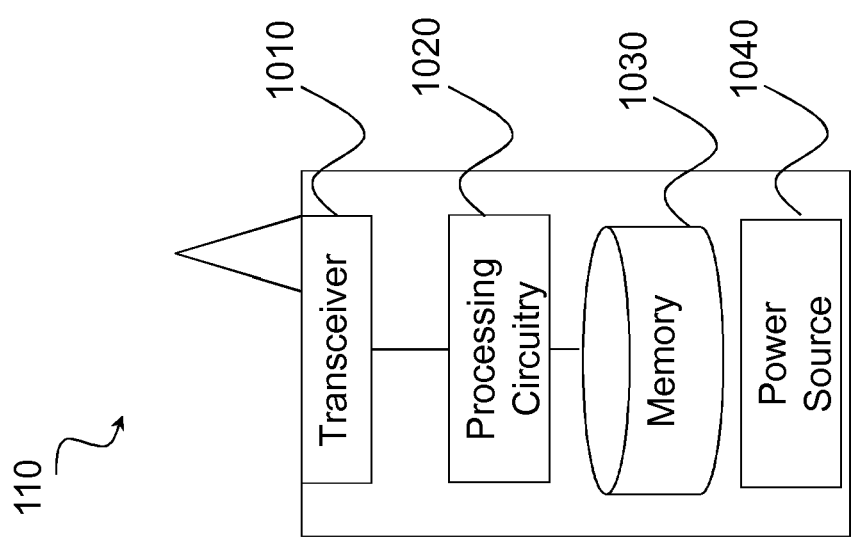
FIG. 10A is a block diagram illustrating an example embodiment of a wireless device.

FIG. 10A is a block diagram illustrating an example embodiment of a wireless device. The wireless device is an example of the wireless devices 110 illustrated in FIG. 7. In particular embodiments, the wireless device is capable of receiving an instruction to measure a set of CSI-RS resources. Each CSI-RS resource of the set of CSI resources carries a CSI-RS. The wireless device may be further capable of calculating a channel estimate for each of the CSI-RS resources in the set; determining, for each of the CSI-RS resources in the set, one or more preferred precoder matrices; determining CQI corresponding to a hypothetical transmission from a number of effective channels, where the effective channels depend on the preferred precoder matrices and channel estimate for each of the CSI-RS resources, and layers transmitted through the effective channels mutually interfere; and transmitting one or more CSI reports to one or more network nodes. Each CSI report may comprise a plurality of one or more preferred precoder matrices and the one or more CQI.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processing circuitry 1020, memory 1030, and power source 1040. In some embodiments, transceiver 1010 facilitates transmitting wireless signals to and receiving wireless signals from wireless network node 120 (e.g., via an antenna), processing circuitry 1020 executes instructions to provide some or all of the functionality described herein as provided by the wireless device, and memory 1030 stores the instructions executed by processing circuitry 1020. Power source 1040 supplies electrical power to one or more of the components of wireless device 110, such as transceiver 1010, processing circuitry 1020, and/or memory 1030.

Processing circuitry 1020 includes any suitable combination of hardware and software implemented in one or more integrated circuits or modules to execute instructions and manipulate data to perform some or all of the described functions of the wireless device. In some embodiments, processing circuitry 1020 may include, for example, one or more computers, one more programmable logic devices, one or more central processing units (CPUs), one or more microprocessors, one or more applications, and/or other logic, and/or any suitable combination of the preceding. Processing circuitry 1020 may include analog and/or digital circuitry configured to perform some or all of the described functions of wireless device 110. For example, processing circuitry 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1040 is generally operable to supply electrical power to the components of wireless device 110. Power source 1040 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

FIG. 10B is a block diagram illustrating example components of a wireless device 110. The components may include receiving module 1050, determining module 1052, and transmitting module 1054.

Receiving module 1050 may perform the receiving functions of wireless device 110. For example, receiving module 1050 may receive a CSI configuration and/or an instruction to measure a set of CSI-RS resources according to any of the examples and embodiments described above (e.g., steps 910 and 912 of FIG. 9A). In certain embodiments, receiving module 1050 may include or be included in processing circuitry 1020. In particular embodiments, receiving module 1050 may communicate with determining module 1052 and transmitting module 1054.

Determining module 1052 may perform the determining functions of wireless device 110. For example, determining module 1052 may select two or more CSI-RS resources from a set of CSI-RS resources, determine a precoder matrix for each of the selected CSI-RS resources, determine a channel estimate for each of the selected CSI-RS resources, and/or determine a CQI corresponding to a hypothetical transmission from a number of effective channels, where the effective channels depend on the determined precoder matrices and channel estimate for each of the selected CSI-RS resources, and layers transmitted through the effective channels mutually interfere (e.g., steps 916-920 of FIG. 9A). In certain embodiments, determining module 1052 may include or be included in processing circuitry 1020. In particular embodiments, determining module 1052 may communicate with receiving module 1050 and transmitting module 1054.

Transmitting module 1054 may perform the transmitting functions of wireless device 110. For example, transmitting module 1054 may transmit one or more CSI reports to one or more network nodes according to any of the examples and embodiments described above (e.g., step 922 of FIG. 9A). In certain embodiments, transmitting module 1054 may include or be included in processing circuitry 1020. In particular embodiments, transmitting module 1054 may communicate with receiving module 1050 and determining module 1052.

FIG. 11A is a block diagram illustrating an example embodiment of a network node. The network node is an example of the network node 120 illustrated in FIG. 7. In particular embodiments, the network node is capable of transmitting two or more CSI-RS to a wireless device and receiving a CSI report from a wireless device with different channel state information for two or more CSI-RS.

Network node 120 can be an eNodeB, a nodeB, gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1110, processor or processing circuitry 1120, at least one memory 1130, and at least one network interface 1140. Transceiver 1110 facilitates transmitting wireless signals to and receiving wireless signals from a wireless device, such as wireless devices 110 (e.g., via an antenna); processing circuitry 1120 executes instructions to provide some or all of the functionality described above as being provided by a network node 120; memory 1130 stores the instructions executed by processing circuitry 1120; and network interface 1140 communicates signals to backend network components, such as a gateway, switch, router, Internet, Public Switched Telephone Network (PSTN), controller, and/or other network nodes 120. Processing circuitry 1120 and memory 1130 can be of the same types as described with respect to processing circuitry 1020 and memory 1030 of FIG. 10A above.

In some embodiments, network interface 1140 is communicatively coupled to processing circuitry 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

Other embodiments of network node 120 include additional components (beyond those shown in FIG. 11A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 11B is a block diagram illustrating example components of a network node 120. The components may include transmitting module 1150 and receiving module 1152.

Transmitting module 1150 may perform the transmitting functions of network node 120. For example, transmitting module 1150 may transmit a set of CSI-RS resources to a wireless device according to any of the examples and embodiments described above (e.g., step 954 of FIG. 9A). Transmitting module 1150 may transmit a CSI report configuration to a wireless device (e.g., step 952 of FIG. 9A). In certain embodiments, transmitting module 1150 may include or be included in processing circuitry 1120. In particular embodiments, transmitting module 1150 may communicate with receiving module 1152.

Receiving module 1152 may perform the receiving functions of network node 120. For example, receiving module 1152 may receive a CSI report according to any of the examples and embodiments described above (e.g., step 956 of FIG. 9A). In certain embodiments, receiving module 1152 may include or be included in processing circuitry 1120. In particular embodiments, receiving module 1152 may communicate with transmitting module 1150.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The examples below provide a non-limiting example of how certain aspects of the embodiments may be implemented within the framework of a specific communication standard. In particular, the examples provide a non-limiting example of how particular embodiments could be implemented within the framework of a 3GPP TSG RAN standard. The changes are merely intended to illustrate how certain aspects of the embodiments could be implemented in a particular standard. However, the embodiments could also be implemented in other suitable manners, both in the 3GPP Specification and in other specifications or standards.

For example, a standard may include the following attributes related to a CSI framework. Regarding RS and interference measurement setting, a specification may rename 'RS setting" as "Resource setting," which comprises configuration for a signal used for channel and/or interference measurement.

Regarding other terminology, a UE can be configured with N≥1 CSI reporting settings, M≥1 Resource settings, and 1 CSI measurement setting, where the CSI measurement setting includes L≥1 links Each of the L links corresponds to a CSI reporting setting and a Resource setting.

The following configuration parameters may be signaled via radio resource control (RRC) at least for CSI acquisition. N, M, and L may be indicated either implicitly or explicitly. In each CSI reporting setting, at least reported CSI parameter(s), CSI Type (I or II) if reported, codebook configuration including codebook subset restriction, time-domain behavior, frequency granularity for CQI and PMI, measurement restriction configurations may be signaled. In each Resource setting, a configuration of S≥1 CSI-RS resource set(s) may be signaled. Each set may correspond to different selections from a pool of all CSI-RS resources configured to the UE. A configuration of Ks≥1 CSI-RS resources for each set s, including at least mapping to REs, the number of ports, time-domain behavior, etc., may be signaled. In each of the L links in CSI measurement setting, CSI reporting setting indication, Resource setting indication, and/or quantity to be measured (either channel or interference) may be signaled. One CSI reporting setting can be linked with one or multiple Resource settings. Multiple CSI reporting settings can be linked with the same Resource setting.

The following may be dynamically selected by L1 or L2 signaling, if applicable: (a) one or multiple CSI reporting settings within the CSI measurement setting; (b) one or multiple CSI-RS resource sets selected from at least one Resource setting; and (c) one or multiple CSI-RS resources selected from at least one CSI-RS resource set.

Regarding NR reception, a single NR-PDCCH may schedule a single NR-PDSCH where separate layers are transmitted from separate TRPs. Multiple NR-PDCCHs each may schedule a respective NR-PDSCH where each NR-PDSCH is transmitted from a separate TRP. The case where a single NR-PDCCH schedules a single NR-PDSCH where each layer is transmitted from all TRPs jointly can be done in a specification-transparent manner. CSI feedback details for the above case can be specified separately.

With non-coherent joint transmission (NC-JT), separate layers are transmitted from each antenna panel or transmission point (TRP) to increase the transmission rank at the UE and correspondingly increase the achievable data rate. The primary benefit of non-coherent JT is to facilitate higher rank transmission where the UE is rank-constrained (e.g., by being line-of-sight (LOS) to the serving transmission point or if the serving transmission point only supports a few layers). By transmitting additional layers from a non-serving transmission point, the UE's peak rate can be increased. For NC-JT to be beneficial though, accurate link adaptation is required as there can be significant inter-layer interference between the transmissions from the multiple TRPs or panels. Furthermore, it is beneficial to select the transmission rank and precoding of the participating TRPs jointly so that an optimal transmission setting can be used.

NC-JT can be supported using the existing CSI framework in NR. For example, a UE could be configured with two CSI Report Settings, each corresponding to a separate TRP, and to feed back a PMI/RI/CQI report corresponding to each TRP corresponding to a single-TRP hypothesis. The reported PMIs can be used directly to precode the transmission from each TRP. However, there are several issues with using the standard-transparent approach: (a) the RIs will likely be chosen too aggressively because they correspond to single-TRP hypothesis and are not selected jointly corresponding to NC-JT hypothesis; (b) the CQIs will be too optimistic because inter-TRP interference is not taken into account; and (c) because PMIs for each TRP are determined independently, PMIs that cause large mutual interference could be selected by the UE.

Thus, a CSI Report Setting that supports NC-JT in the NR CSI framework is beneficial. For optimal performance, the UE may dynamically select between single-TRP (i.e., DPS) or NC-JT transmission from multiple TRPs. The selection may be fed back in a single CSI report. Even if the UE indicates that it prefers NC-JT transmission, however, the UE cannot be certain that the network can accommodate NC-JT transmission and single-TRP transmission may be applied instead. Thus, the network needs CSI available for both NC-JT and single-TRP hypothesis, which means that several CSI Report Settings may be configured for the UE.

Particular 3GPP working groups considered the following options for CSI enhancements for NC-JT CSI feedback. Option 1 uses a single CSI process with K>1 CSI-RS resources. Channel measurement and inter-TP interference measurement can be flexibly configured based on the selection of these K CSI-RS resource for different hypothesis.

Option 2 uses a single CSI process with enhanced codebook and an aggregated CSI resource from multiple CSI-RS resources. CSI-RS resources from multiple TPs are aggregated to form one CSI-RS resource. An enhanced codebook with the codeword structure considering non-coherent joint transmission can be applied to the aggregated channel measured from the aggregated CSI-RS. An example of the codeword structure considering two-TP joint transmission is $$W = \begin{bmatrix} W_a & 0 \\ 0 & W_b \end{bmatrix},$$

where $W_a$ and $W_b$ are the precoding matrices applied to the two TPs respectively.

Option 3 uses multiple CSI processes with dependency among CSI processes. For the multiple CSI processes mechanism, dependency among the CSI-processes can be considered. In this way, different interference assumption for each TP is indicated. More specially, the calculated CSI of one CSI process, e.g., PMI, from the first TP can be treated as configuration of interferer during the CSI calculation for another CSI process (i.e., for another TP). This indication may be used to improve the CSI accuracy assuming advanced receiver, e.g., SIC.

Because NR uses a flexible CSI framework, a preferred approach to support NC-JT CSI feedback may be a mixture of the first two options above. Thus, a particular CSI framework may include TRPs or antenna panels that transmit their CSI-RS in separate CSI resources rather than with different ports in the same CSI-RS resource, because the CSI-RS from different TRPs cannot be assumed to be QCL, and further, a QCL indication between CSI-RS ports and DMRS ports for each TRP may be needed. To indicate QCL with corresponding DMRS, each TRP may transmit separate CSI-RS resources.

Different TRPs may be equipped with different antennas (e.g., having a different number of ports or port layouts). Therefore, following the Option 2 above directly may be cumbersome, because a variety of different codebooks for multi-TRP would have to be defined.

Rather, it is simpler to define a separate codebook for each TRP that is applied with a CSI-RS resource associated with the TRP, rather than aggregating the CSI-RS resources and applying a joint codebook. TRPs participating in NC-JT can be equipped with different antennas and require different codebooks.

Another consideration is that even if the UE can recommend a NC-JT transmission, the recommendation may not always be optimal, because the UE may desire a low rank transmission. Thus, the UE may be able to dynamically indicate how many TRPs it desires to participate in the NC-JT (including single point transmission hypothesis). Accordingly, the network may configure a maximum number of TRPs/CSI-RS resources and the UE may dynamically select a number of CSI-RS resources to be included in the CSI report. It is beneficial for the UE to dynamically select how many TRPs shall participate in the NC-JT To calculate CSI for a NC-JT hypothesis, the UE can select a number of CSI-RS resources. Each CSI-RS resource can be associated with a precoder codebook (e.g., a port layout $(N_1, N_2)$). For each of the selected CSI-RS resources, the UE calculates a preferred precoder matrix from the associated codebook, under the assumption that transmission occurs from all of the CSI-RS resources simultaneously. The resulting rank the UE shall select for the hypothetical transmission is thus the sum of the per-resource ranks $\upsilon_{TOT} = \Sigma_{k=1}^{K} \upsilon_k$, where $\upsilon_k$ is the rank of the precoder hypothesis for selected CSI-RS resource index k and K is the number of selected resources.

The UE makes the precoder selection on the basis that the layers corresponding to different CSI-RS resources mutually interfere. For instance, if $W_k$ is the desired precoder matrix of rank $\upsilon_k$ for CSI-RS resource $k \in \{1 \ldots K\}$ and $H_k$ is the channel estimate of the CSI-RS ports of resource k, the following effective channels is used for the hypothetical PDSCH transmission when determining PMI and $$CQI: \; H_{\mathit{eff}} = [H_1 \ldots H_K] \begin{bmatrix} W_1 & \cdots & 0 \\ \vdots & \ddots & \vdots \\ 0 & \cdots & W_K \end{bmatrix} = [H_1 W_1 \ldots H_K W_K].$$

Thus, the inter-layer interference across selected CSI-RS resources may be considered. An example of multi-resource selection is illustrated in FIG. 8.

Furthermore, each TRP may use either non-precoded CSI-RS or a set of beamformed CSI-RS. In the latter case, each TRP is associated with a number of CSI-RS resources that is selected with a CRI by the UE. Thus, the selection of a CSI-RS resource within a TRP (or panel) may be differentiated from the selection of multiple CSI-RS resources corresponding to different TRPs for NC-JT.

To efficiently facilitate the differentiation, a CSI Report Setting for NC-JT hypothesis can be linked with several NZP CSI-RS Resource Settings for channel measurement, where each Resource Setting corresponds to a TRP. Within each Resource Setting, the UE could for example be configured with multiple CSI-RS resource sets, each comprising a number of CSI-RS resources, in case the TRP is utilizing beamformed CSI-RS with resource pooling, or, on the other extreme, a single NZP CSI-RS resource in case the TRP utilizes non-precoded CSI-RS. For each (channel) Resource Setting in the CSI Report Setting, there is an association with a precoder codebook (or simply a port layout) to use for the CSI-RS resources within that Resource Setting. The TRP selection is performed by selecting one or more of the configured Resource Settings and for each selected Resource Setting, a PMI/RI and possibly a CRI is determined.

The Resource Setting selection can be performed with a Hypothesis Indicator (HI). For example, a UE may be configured with a set of possible hypotheses for DPS and NC-JT in the CSI Report Setting, for example, according to Table 2 where a '1' indicates that a Resource Setting is selected and a '0' indicates the opposite.

TABLE 2

Example of DPS and NC-JT hypotheses

| Hypothesis Indicator (HI) | Resource Setting #1 (TRP #1) | Resource Setting #2 (TRP #2) | Resource Setting #2 (TRP #3) |
|---|---|---|---|
| 0 (DPS) | 1 | 0 | 0 |
| 1 (DPS) | 0 | 1 | 0 |
| 2 (DPS) | 0 | 0 | 1 |
| 3 (NC-JT) | 1 | 1 | 0 |
| 4 (NC-JT) | 0 | 1 | 1 |
| 5 (NC-JT) | 1 | 0 | 1 |
| 6 (NC-JT) | 1 | 1 | 1 |

By configuring which hypotheses a UE is able to select from in the CSI Report Setting, the network can configure different CSI Report Settings for e.g. DPS and NC-JT and trigger different CSI reports for the different sets of hypotheses. Another possibility is to configure only a single hypothesis, in that case, the UE does not need to feed back an HI.

Figure 12:
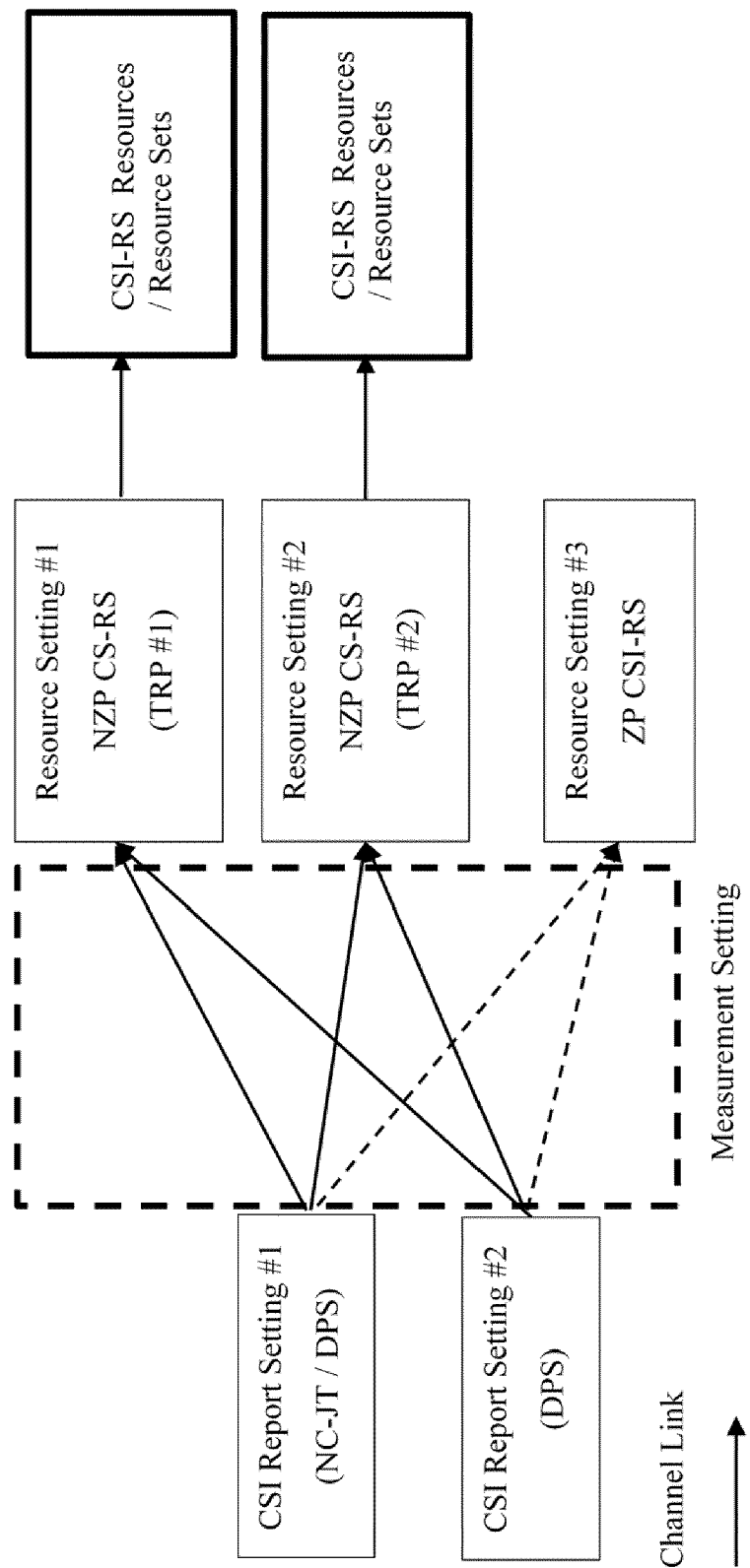
FIG. 12 is a block diagram illustrating configuration of an example CSI framework for NC-JT.

An example of how the CSI framework supports multi-TRP NC-JT CSI feedback is illustrated in FIG. 12. Each CSI Report Setting corresponds to different sets of configured channel hypotheses.

In general, to support NC-JT CSI feedback, a CSI Report Setting can be linked with more than one Resource Setting for channel measurement. The CSI Report Setting associates each Resource Setting with a precoder codebook. A CSI Report Setting is further configured with a set of hypotheses for channel measurement, wherein each hypothesis selects a subset of the linked Resource Settings for channel measurement and where the UE selects one hypothesis from the set as part of the CSI report. For the selected Resource Settings, the UE determines PMI, RI and if applicable CRI for each Resource Setting jointly, on the basis that the layers from CSI-RS resources in different Resource Settings mutually interfere.

NC-JT may be supported either within a PDSCH, where the different layers of the PDSCH correspond to different TRPs, or using multiple PDSCH each transmitted from a separate TRP. The same CSI framework may be used for both cases, but a difference is what codeword-to-layer mapping to assume and how many CQIs to calculate, because e.g. a rank-4 NC-JT transmission where each TRP transmits two layers each can either be mapped to 1 or 2 codewords depending on if 1 or 2 PDSCH(s) is used. Thus, the UE needs to know what is assumed. This could be configured in the Resource Setting. For CSI feedback with NC-JT hypothesis, the CSI Report Setting may contain information on whether single or multiple PDSCH is assumed for CQI calculation.

Regarding feedback of the CSI report, it simple to consider transmission of a single CSI feedback report containing all PMIs/CQIs, even if multiple PDCCH/PDSCH operation is used (i.e., CSI report is not split up into several per-TRP CSI reports). Even if the TRPs are not perfectly synchronized and, for example, manage their own HARQ buffers requiring independent HARQ-ACK feedback on separate PUCCH transmissions, CSI feedback generally is not as delay-sensitive as HARQ feedback and may be shared by the TRPs over a non-ideal backhaul link (or scheduling information of the uplink resource allocation of the physical channel carrying the CSI report could be shared and the TRPs could independently receive the uplink transmission). Because CSI feedback for NC-JT most likely is aperiodically triggered, and thus carried on PUSCH, the UE may transmit several PUSCHs simultaneously if per-TRP CSI feedback is used, which could become cumbersome from e.g. a power control perspective and should be avoided. Accordingly, CSI feedback for NC-JT may be contained in a single report, and not split up in per-TRP CSI reports on separate PUCCH/PUSCH transmissions.

Abbreviations used in the preceding description include:
3GPP Third Generation Partnership Project
BTS Base Transceiver Station
CoMP Coordinated Multiple Transmission Point
CQI Channel Quality Indicator
CRC Cyclic Redundancy Check
CRI CSI-RS Resource Indicator
C-RNTI Cell Radio Network Temporary Identifier
CSI Channel State Information
CSI-RS Channel State Information Reference Signal
D2D Device to Device
DCI Downlink Control Information
DFT Discrete Fourier Transform
eNB eNodeB
FDD Frequency Division Duplex
HARQ Hybrid Automatic Repeat Request
LTE Long Term Evolution
MAC Medium Access Control
M2M Machine to Machine
MCS Modulation and Coding Scheme
MIMO Multi-Input Multi-Output
MTC Machine Type Communication
NC-JT Non-Coherent Joint Transmission
NR New Radio
OFDM Orthogonal Frequency Division Multiplexing
PDCCH Physical Downlink Control Channel
PDSCH Physical Downlink Shared Channel
PMI Precoder Matrix Index
PRB Physical Resource Block
PUCCH Physical Uplink Control Channel
PUSCH Physical Uplink Shared Channel
QAM Quadrature Amplitude Modulation
QCL Quasi-Colocation
QPSK Quadrature Phase-Shift Keying
RAN Radio Access Network
RAT Radio Access Technology
RB Resource Block
RBS Radio Base Station
RI Rank Indicator
RNC Radio Network Controller
RRC Radio Resource Control
RRH Remote Radio Head
RRU Remote Radio Unit
SINR Signal-to-Interference-plus-Noise Ratio
SPS Semi Persistent Scheduling
TDD Time Division Duplex
UCI Uplink Control Information
UE User Equipment
UL Uplink
URLLC Ultra-Reliable Low-Latency Communication
UTRAN Universal Terrestrial Radio Access Network
WAN Wireless Access Network

The invention claimed is:

1. A method performed by a user equipment for reporting channel state information in a wireless communication system, wherein the user equipment is configured with two or more channel state information reference signal, CSI-RS, resources in a CSI-RS resource set, the method comprising:
    selecting at least two CSI-RS resources from the CSI-RS resource set, wherein each of the at least two selected CSI-RS resources are associated to a set of spatially multiplexed layers, wherein different sets comprise different layers;
    determining a preferred precoder matrix for each of the selected CSI-RS resources; and
    transmitting a CSI report indicating each of the selected CSI-RS resources and the determined preferred precoder matrix for each of the selected CSI-RS resources.

2. The method of claim 1, further comprising:
    calculating a channel estimate for each of the selected CSI-RS resources;
    determining a channel quality indicator, CQI, corresponding to a hypothetical transmission on a plurality of effective channels, where the effective channels depend on the preferred precoder matrices and channel estimate for each of the selected CSI-RS resources, and where layers transmitted through the effective channels mutually interfere; and
    wherein the CSI report further indicates the determined CQI for each of the selected CSI-RS resources.

3. The method of claim 1, wherein each CSI-RS resource is associated with at least one of:

a number of antenna ports (P);
a multi-panel antenna array port layout parametrized by a number of vertical panels ($M_g$) and a number of horizontal panels ($N_g$); and
a precoder codebook.

4. The method of claim 1, wherein each CSI-RS resource is associated with a different quasi co-location, QCL, assumption.

5. The method of claim 1, wherein the CSI-RS carried in each CSI-RS resource of the set of CSI-RS resources is transmitted from different antenna subsets.

6. The method of claim 5, wherein the different antenna subsets belong to different transmission points.

7. The method of claim 1, further comprising:
obtaining a CSI report configuration comprising possible hypotheses for combinations of one or more CSI-RS resources; wherein:
selecting the at least two CSI-RS resources comprises selecting the at least two CSI-RS resources according to a selected one of the possible hypotheses; and
the CSI report indicates the selected CSI-RS resources by indicating the selected possible hypothesis.

8. The method of claim 1, wherein transmitting the CSI report comprises transmitting a first message associated with one of the selected CSI-RS resources and transmitting a second message associated with a second one of the selected CSI-RS resources.

9. The method of claim 8, wherein the first message is transmitted to a first transmission point and the second message is transmitted to a second transmission point.

10. The method of claim 1, wherein the determined preferred precoder matrix for at least one selected CSI-RS comprises a first preferred precoder matrix for a first subband;
the method further comprises determining, for the at least one selected CSI-RS resource, a second preferred precoder matrix for a second subband; and
wherein the CSI report indicates the first and second preferred precoder matrix for the at least one selected CSI-RS resource.

11. The method of claim 1, further comprising receiving an indication of a codeword-to-layer mapping for use when determining the CQI.

12. The method of claim 1, wherein:
a set of demodulation reference signal, DMRS, antenna ports are numbered between 7-14;
a set of CSI-RS antenna ports are numbered between 15-31; and
a set of physical downlink shared channel, PDSCH, signals on antenna ports $\{p_k, p_{k+1}\}$, where $p_k = 7 + \Sigma_{l=1}^{k-1}$, result in signals equivalent to corresponding symbols transmitted on antenna ports $\{15, \ldots, 14+P_k\}$ corresponding to CSI-RS resource k in a set of K CSI-RS resources, as given by $[y^{(15)} \ldots y^{(14+P_k)}]^T = W_k [x^{(p_k)} \ldots x^{(p_{k+1})}]$ where $x^{(7)}, \ldots, x^{(6+v_{TOT})}$ with $v_{TOT} = \Sigma_{k=1}^{K} v_k$ is a vector of symbols, where each symbol corresponds to a layer to be transmitted to the user equipment and contains all layers transmitting the PDSCH.

13. The method of claim 1, wherein the determined preferred precoder for a CSI-RS resource with index k of the selected CSI-RS resources is a matrix $W_k$ that is determined in accordance with a transmission vector y being equivalent to using $W_k$ on a set of layers in a vector x of physical downlink shared channel, PDSCH, signals transmitted to the user equipment according to $y = W_k x$, wherein y is a transmission on antenna ports corresponding to the CSI-RS resource with index k.

14. The method of claim 1, wherein:
the PDSCH signals are on a set of $v_k$ demodulation reference signal, DMRS, antenna ports that are indexed starting with a first port number $D_1$;
the CSI-RS resource with index k comprises $P_k$ antenna ports, and has a first antenna port with index $C_1$; and
the PDSCH signals on antenna ports $\{q_k, q_{k+1}\}$, where $q_k = D_1 + \Sigma_{l=1}^{k-1} v_l$, result in signals equivalent to transmission on antenna ports $\{C_1, \ldots, C_1 + P_k\}$ corresponding to CSI-RS resource k, as given by $[y^{(15)} \ldots y^{(14+P_k)}]^T = W_k [x^{(q_k)} \ldots x^{(q_{k+1})}]^T$.

15. A user equipment capable of reporting channel state information in a wireless communication system, wherein the user equipment is configured with two or more channel state information reference signal, CSI-RS, resources in a CSI-RS resource set, and wherein the user equipment comprises processing circuitry operable to:
select at least two CSI-RS resources from the CSI-RS resource set, wherein each of the at least two selected CSI-RS resources are associated to a set of spatially multiplexed layers, wherein different sets comprise different layers;
determine a preferred precoder matrix for each of the selected CSI-RS resources; and
transmit a CSI report indicating each of the selected CSI-RS resources and the determined preferred precoder matrix for each of the selected CSI-RS resources.

16. The user equipment of any one of claim 15, wherein the processing circuitry is further operable to:
calculate a channel estimate for each of the selected CSI-RS resources;
determine a channel quality indicator, CQI, corresponding to a hypothetical transmission from a plurality of effective channels, where the effective channels depend on the preferred precoder matrices and channel estimate for each of the selected CSI-RS resources, and where layers transmitted through the effective channels mutually interfere; and
wherein the CSI report further indicates the determined CQI for each of the selected CSI-RS resources.

17. The user equipment of claim 15, wherein each CSI-RS resource is associated with at least one of:
a number of antenna ports (P);
a multi-panel antenna array port layout parametrized by a number of vertical panels ($M_g$) and a number of horizontal panels ($N_g$); and
a precoder codebook.

18. The user equipment of claim 15, wherein each CSI-RS resource is associated with a different quasi co-location, QCL, assumption.

19. The user equipment of claim 15, the processing circuitry further operable to:
obtain a CSI report configuration comprising possible hypotheses for combinations of one or more CSI-RS resources; wherein:
the processing circuitry is operable to select the at least two CSI-RS resources by selecting the at least two CSI-RS resources according to a selected one of the possible hypotheses; and
the CSI report indicates the selected CSI-RS resources by indicating the selected possible hypothesis.

20. The user equipment of claim 15, the processing circuitry further operable to receive an indication of a codeword-to-layer mapping for use when determining the CQI.

21. A method performed by a network node of a wireless communication system, the method comprising:
   transmitting, to a user equipment, a first channel state information reference signal, CSI-RS, in a first CSI-RS resource of a set of at least two CSI-RS resources from a first antenna subset and a second CSI-RS in a second CSI-RS resource in the set of at least two CSI-RS resources from a second antenna subset, wherein the first and second antenna subsets comprise a first and second set of spatially multiplexed layers, respectively, and wherein the first and second set of layers are different; and
   receiving, from the user equipment, a CSI report comprising a first preferred precoder matrix associated with the first CSI-RS resource and a second preferred precoder matrix associated with the second CSI-RS resource.

22. The method of any one of claim 21, wherein the CSI report further comprises a channel quality indicator, CQI, associated with each of the first and second preferred precoder matrices.

23. The method of claim 21, wherein the first and second antenna subsets belong to different transmission points.

24. The method of claim 21, further comprising transmitting, to the user equipment, a CSI report configuration comprising possible hypotheses for combinations of CSI-RS resources.

25. The method of claim 21, further comprising transmitting, to the user equipment, an indication on a codeword-to-layer mapping for use when determining the CQI.

26. A network node of a wireless communication system, the network node comprising processing circuitry operable to:
   transmit, to a user equipment, a first channel state information reference signal, CSI-RS, in a first CSI-RS resource of a set of at least two CSI-RS resources from a first antenna subset and a second CSI-RS in a second CSI-RS resource in the set of at least two CSI-RS resources from a second antenna subset, wherein the first and second antenna subsets comprise a first and second set of spatially multiplexed layers, respectively, and wherein the first and second set of layers are different; and
   receive, from the user equipment, a CSI report comprising a first preferred precoder matrix associated with the first CSI-RS resource and a second preferred precoder matrix associated with the second CSI-RS resource.

* * * * *

UNITED STATES PATENT AND TRADEMARK OFFICE
CERTIFICATE OF CORRECTION

PATENT NO. : 11,757,495 B2
APPLICATION NO. : 17/666179
DATED : September 12, 2023
INVENTOR(S) : Faxér et al.

It is certified that error appears in the above-identified patent and that said Letters Patent is hereby corrected as shown below:

In the Drawings

In Fig. 12, Sheet 13 of 13, and on the title page, the illustrative print figure, delete "Resource Setting #1 NZP CS-RS" and insert -- Resource Setting #1 NZP CSI-RS --, therefor.

In Fig. 12, Sheet 13 of 13, and on the title page, the illustrative print figure, delete "Resource Setting #2 NZP CS-RS" and insert -- Resource Setting #2 NZP CSI-RS --, therefor.

In Fig. 12, Sheet 13 of 13, and on the title page, the illustrative print figure, delete "ZP CSI-RS" and insert -- NZP CSI-RS --, therefor.

In the Specification

In Column 1, Line 9, delete "2019" and insert -- 2019, now Pat. No. 11,245,444, --, therefor.

In Column 1, Lines 13-14, delete "SYSTEM'" and insert -- SYSTEM" --, therefor.

In Column 1, Line 63, delete "½α ms." and insert -- $\frac{1}{2}\alpha$ ms. --, therefor.

In Column 4, Line 47, delete "$y_i$" and insert -- $y_j$ --, therefor.

In Column 9, Lines 13-17, delete "
$$w_{1D}(l, N_1, O_1, \beta) = \frac{1}{N_1} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix}$$
" and insert Signed and Sealed this
Third Day of September, 2024

Katherine Kelly Vidal
*Director of the United States Patent and Trademark Office*

CERTIFICATE OF CORRECTION (continued)
U.S. Pat. No. 11,757,495 B2

-- $$w_{1D}(l, N_1, O_1) = \frac{1}{\sqrt{N_1}} \begin{bmatrix} e^{j2\pi \cdot 0 \frac{l}{O_1 N_1}} \\ e^{j2\pi \cdot 1 \frac{l}{O_1 N_1}} \\ \vdots \\ e^{j2\pi \cdot (N_1-1) \frac{l}{O_1 N_1}} \end{bmatrix},$$ --, therefor.

In Column 10, Line 15, delete "nth" and insert -- $n^{th}$ --, therefor.

In Column 18, Line 4, delete "120" and insert -- 120) --, therefor.

In Column 21, Line 26, delete "$[y^{(15)} \ldots y^{(14+P_k)}]^T = W_k [x^{(p_k)} \ldots x^{(p_{k+1})}]^T$," and insert -- $[y^{(15)} \ldots y^{(14+P_k)}]^T = W_k [x^{(p_k)} \ldots x^{(p_{k+1})}]^T$ --, therefor.

In Column 27, Line 46, delete "links" and insert -- links. --, therefor.

In Column 30, Lines 51-53, delete "Resource Setting #2 (TRP #3)" and insert -- Resource Setting #3 (TRP #3) --, therefor.

In the Claims

In Column 33, Line 52, in Claim 12, delete "$p_k=7+\Sigma_{l=1}^{k-1}$," and insert -- $p_k = 7 + \sum_{l=1}^{k-1} v_l,$ --, therefor.

In Column 34, Line 1, in Claim 13, delete "y=W$_k$X," and insert -- y=W$_k$x, --, therefor.